US 8,707,033 B2

(12) United States Patent
Isozaki et al.

(10) Patent No.: US 8,707,033 B2
(45) Date of Patent: Apr. 22, 2014

(54) INFORMATION PROCESSING APPARATUS AND INFORMATION PROCESSING METHOD

(75) Inventors: Hiroshi Isozaki, Kawasaki (JP);
Yoshinobu Fujiwara, Tokyo (JP);
Kunio Honsawa, Tokyo (JP); Taku Kato, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 43 days.

(21) Appl. No.: 13/323,182

(22) Filed: Dec. 12, 2011

(65) Prior Publication Data
US 2012/0084558 A1     Apr. 5, 2012

Related U.S. Application Data

(63) Continuation of application No. PCT/JP2009/060779, filed on Jun. 12, 2009.

(51) Int. Cl.
*H04L 9/06*     (2006.01)

(52) U.S. Cl.
USPC ............................ 713/160; 713/161; 713/171

(58) Field of Classification Search
USPC ........................................................ 713/160
See application file for complete search history.

(56) References Cited

U.S. PATENT DOCUMENTS

| | | | |
|---|---|---|---|
| 7,681,244 B2 * | 3/2010 | Morioka et al. | ................. 726/29 |
| 8,098,388 B2 * | 1/2012 | Suzuki et al. | ................. 358/1.15 |
| 2003/0231334 A1 | 12/2003 | Nagai et al. | |
| 2004/0098252 A1 | 5/2004 | Ichimura | |
| 2005/0228858 A1 | 10/2005 | Mizutani et al. | |
| 2006/0265735 A1 | 11/2006 | Ohno | |
| 2007/0186110 A1 * | 8/2007 | Takashima | ................. 713/173 |

FOREIGN PATENT DOCUMENTS

| | | |
|---|---|---|
| JP | 2003-345661 | 12/2003 |
| JP | 2004-7494 | 1/2004 |
| JP | 2004-104470 | 4/2004 |
| JP | 2005-275828 | 10/2005 |
| JP | 2006-323707 | 11/2006 |

OTHER PUBLICATIONS

International Search Report mailed Feb. 16, 2010 in PCT/JP2009/060779 filed Jun. 12, 2009.
"Digital Transmission Content Protection Specification vol. 1", Hitachi, Ltd., Intel Corporation, Matsushita, Sony, Toshiba Corporation, Revision 1.51, Oct. 1, 2007, 41 pages.

(Continued)

*Primary Examiner* — Kaveh Abrishamkar
*Assistant Examiner* — Tri Tran
(74) *Attorney, Agent, or Firm* — Oblon, Spivak, McClelland, Maier & Neustadt, L.L.P.

(57) ABSTRACT

An information processing apparatus has an authentication and key exchange processing unit, a packet selector, a content key generator, a content decryption unit to decrypt, based on the content key, the encrypted content which is included in the content packet and received following the CCI packet, a CCI set identifier management unit to manage a CCI identifier corresponding to recognizable copy control information, a CCI selector, a CCI analyzer to analyze copy control information corresponding to the CCI identifier selected by the CCI selector, a content processing unit to perform, based on an analysis result of the CCI analyzer, the receiving process on the content data corresponding to the content packet received following the CCI packet, a first communication connection unit to perform the authentication and key exchange process, and a second communication connection unit to transmit the content packet and the CCI packet.

19 Claims, 18 Drawing Sheets

(56) References Cited

OTHER PUBLICATIONS

DTCP vol. 1 Supplement E Mapping DTCP to IP, Hitachi, Ltd., Intel Corporation, Matsushita, Sony Toshiba Corporation, Revision 1.2, Jun. 15, 2007, 23 pages.

Operationsal Guidelines for Digital Satellite Broadcasting, ARIB TR-B14, Terrestrial Digital Television Broadcasting Application Rule Technical Material, Association of Radio Industries and Businesses, 36 pages.

International Preliminary Report on Patentability (English transalation) issued Jan. 26, 2012, in International application No. PCT/JP2009/060779.

* cited by examiner

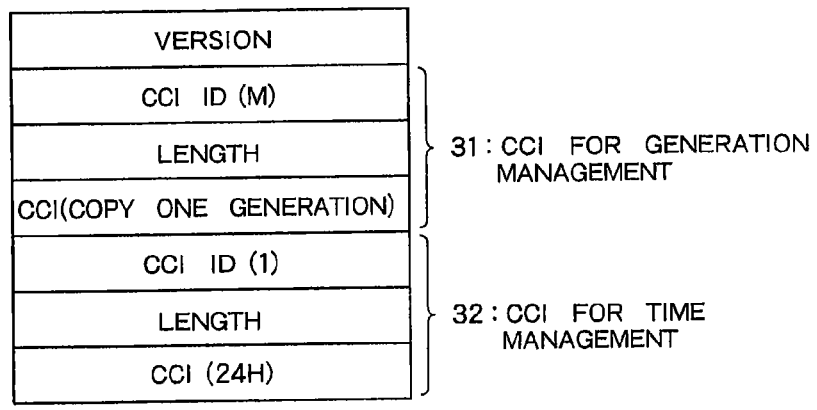
F I G. 5
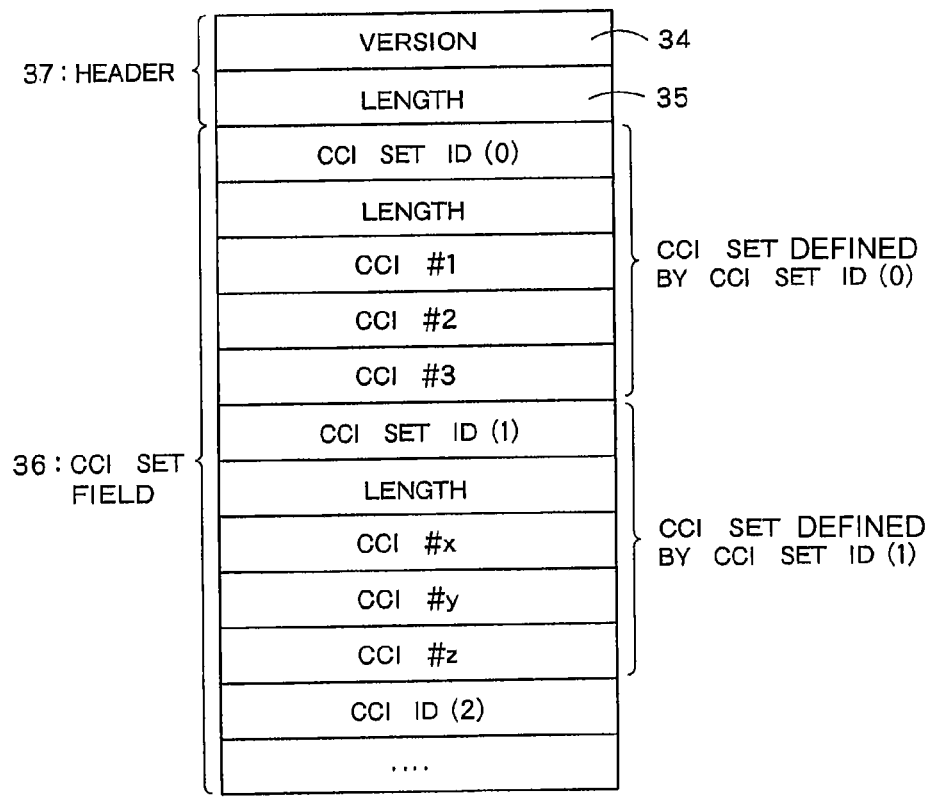
F I G. 6

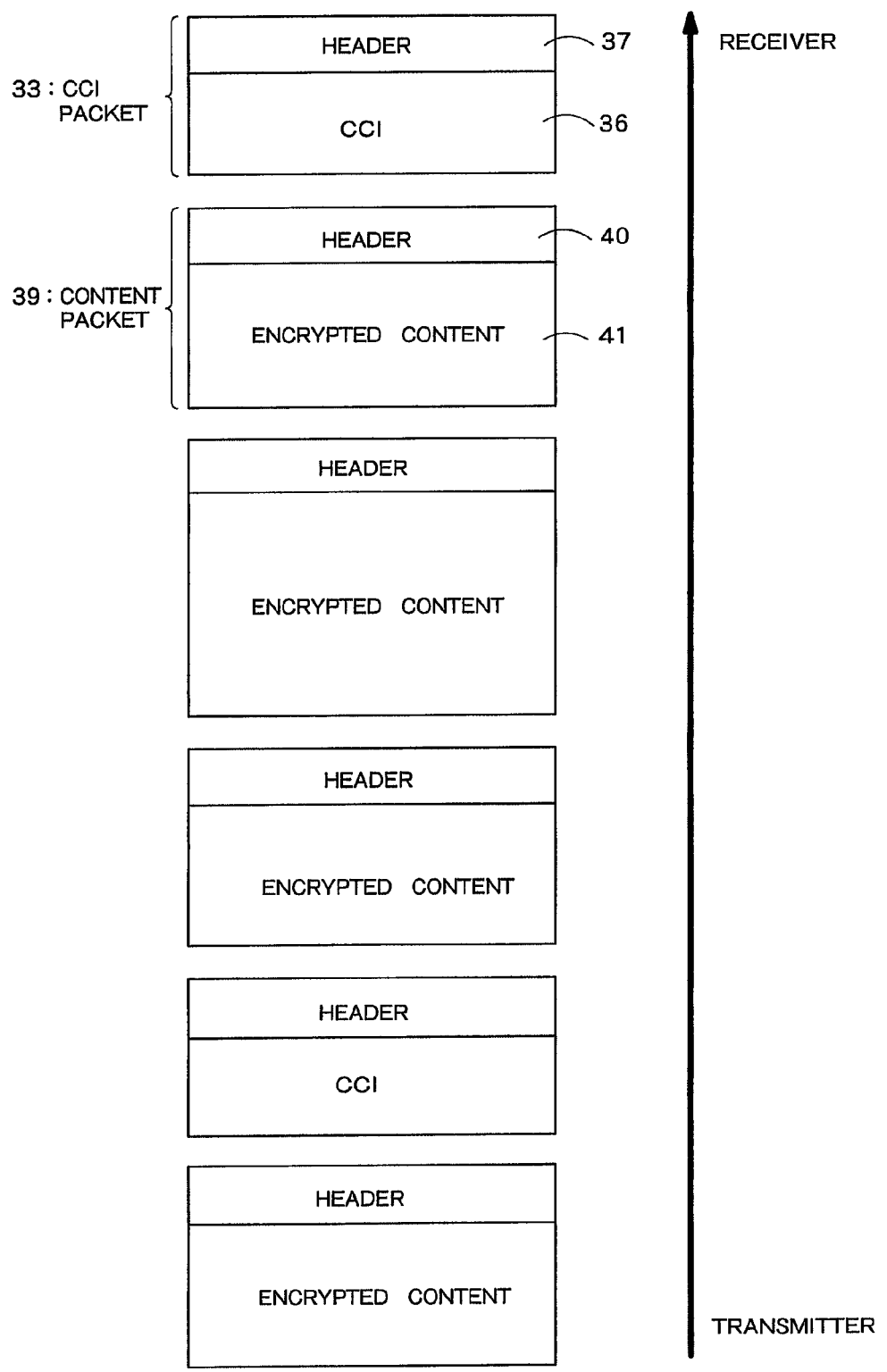
F I G. 7

39 : CONTENT PACKET

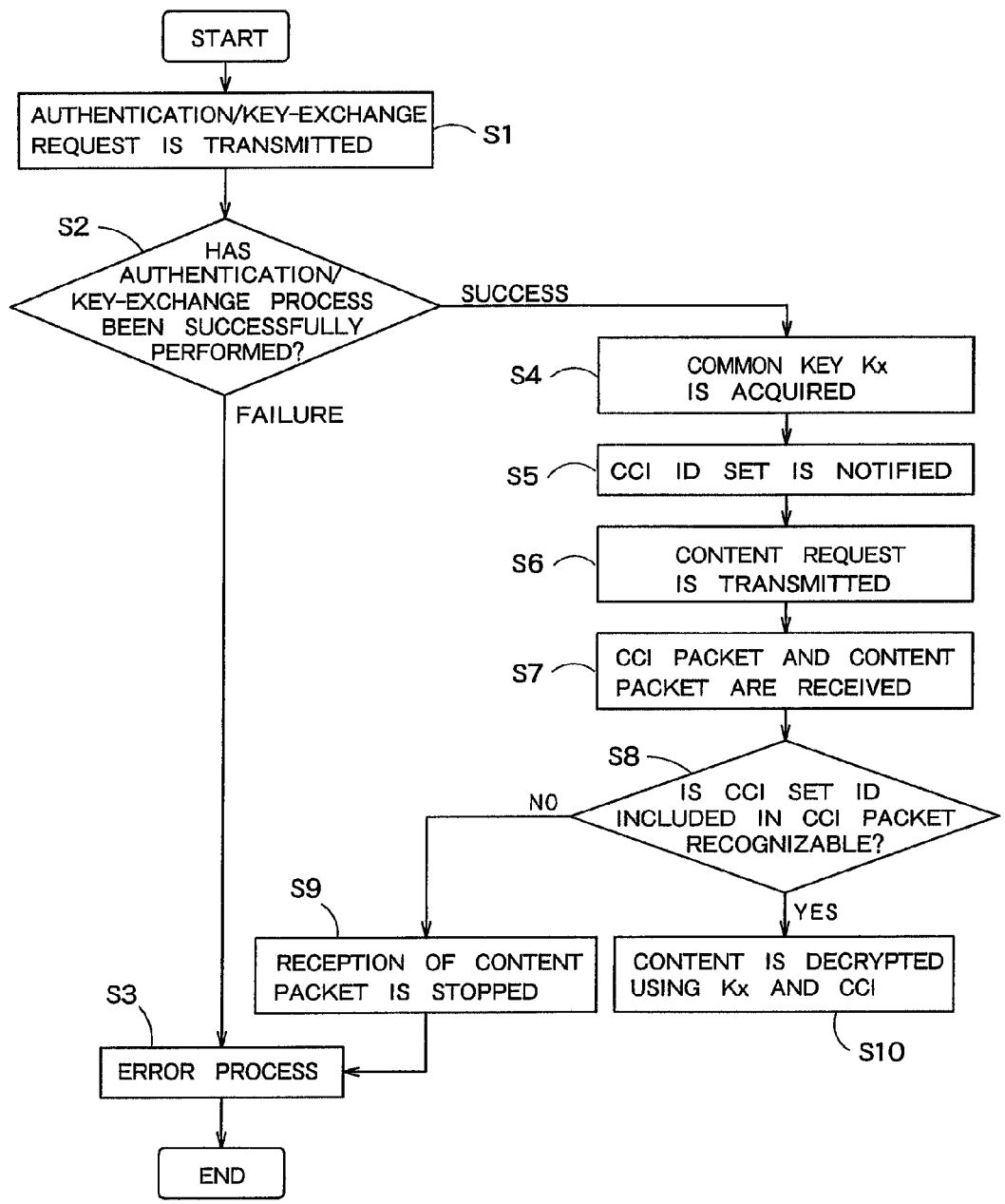
F I G. 11

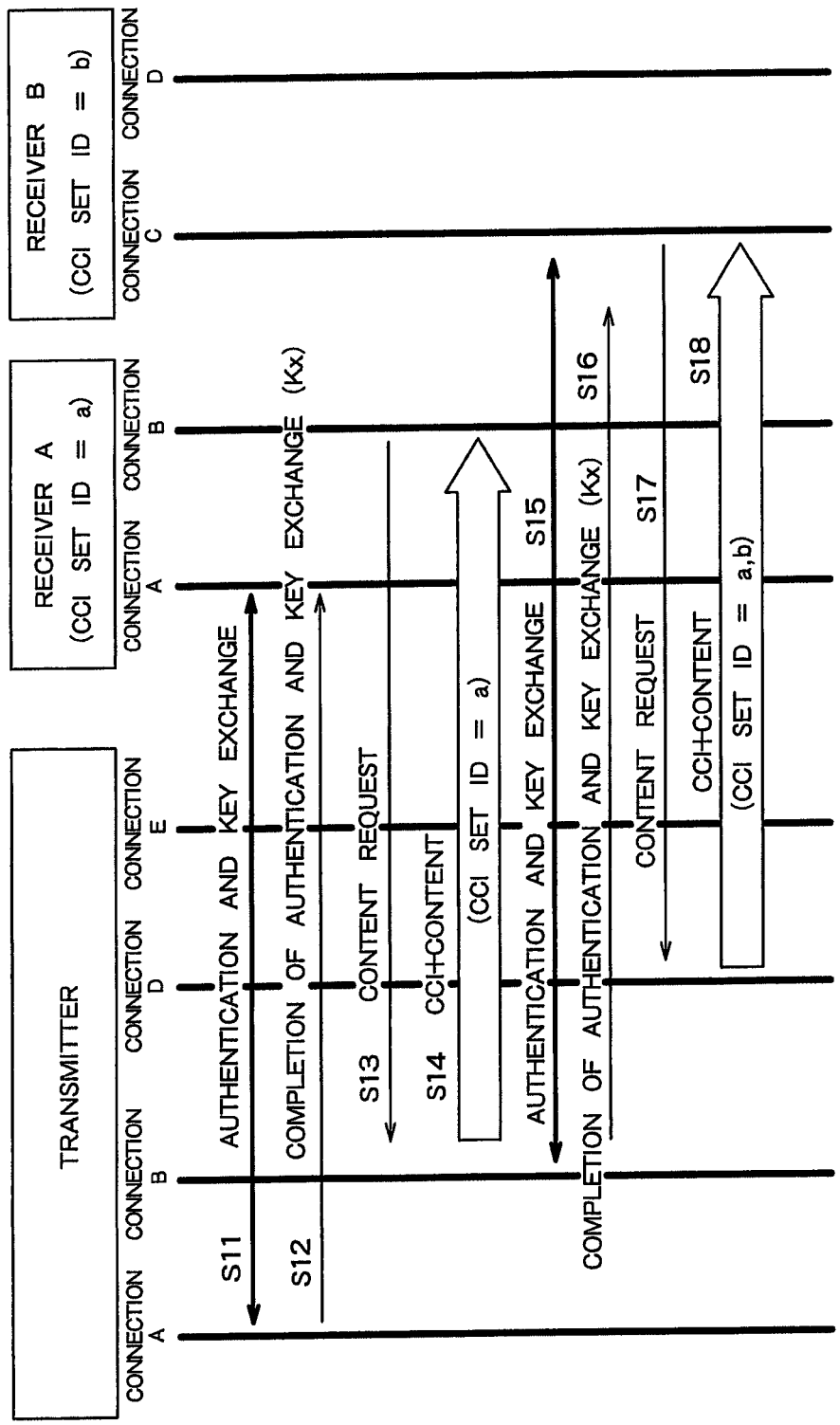
F I G. 12

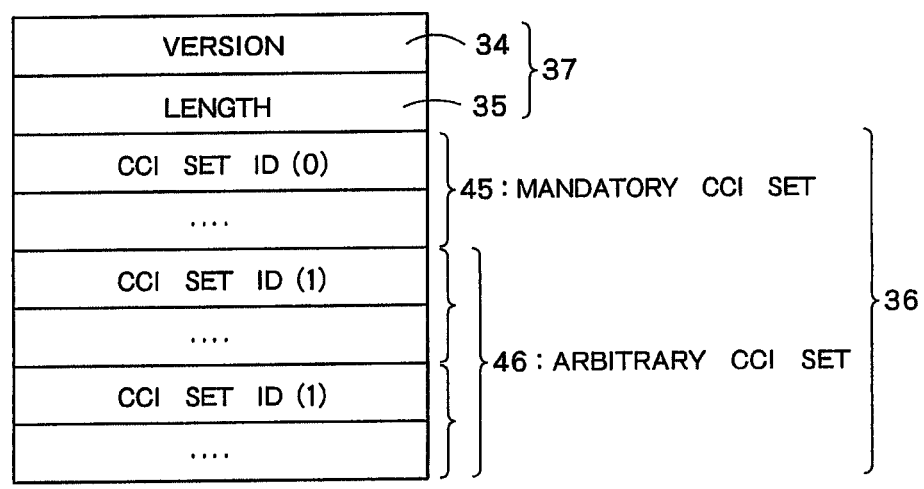
33 : CCI PACKET
F I G. 13

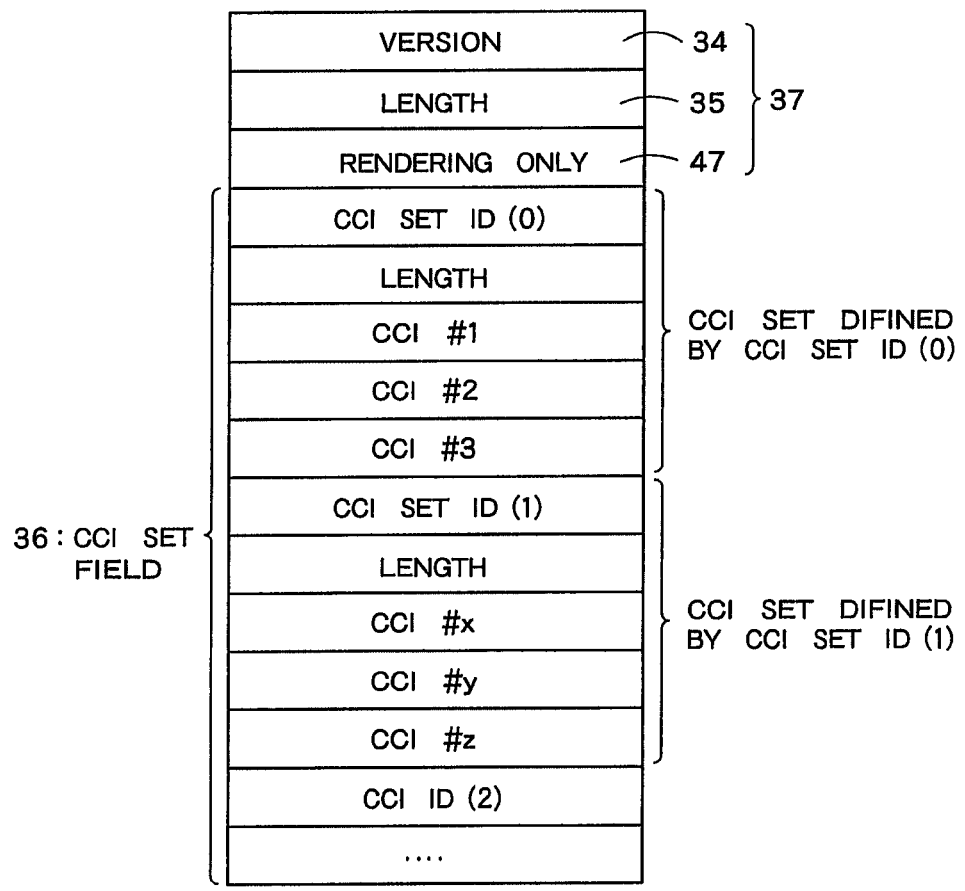
F I G. 15

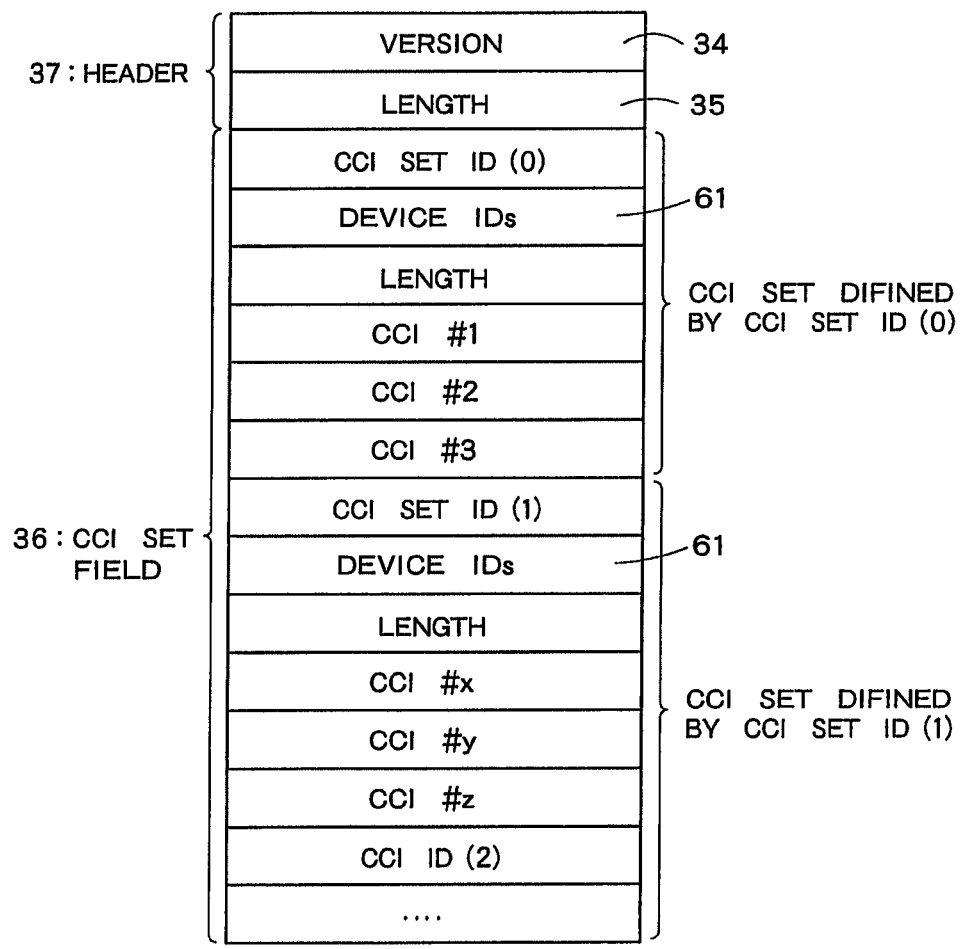
F I G. 17

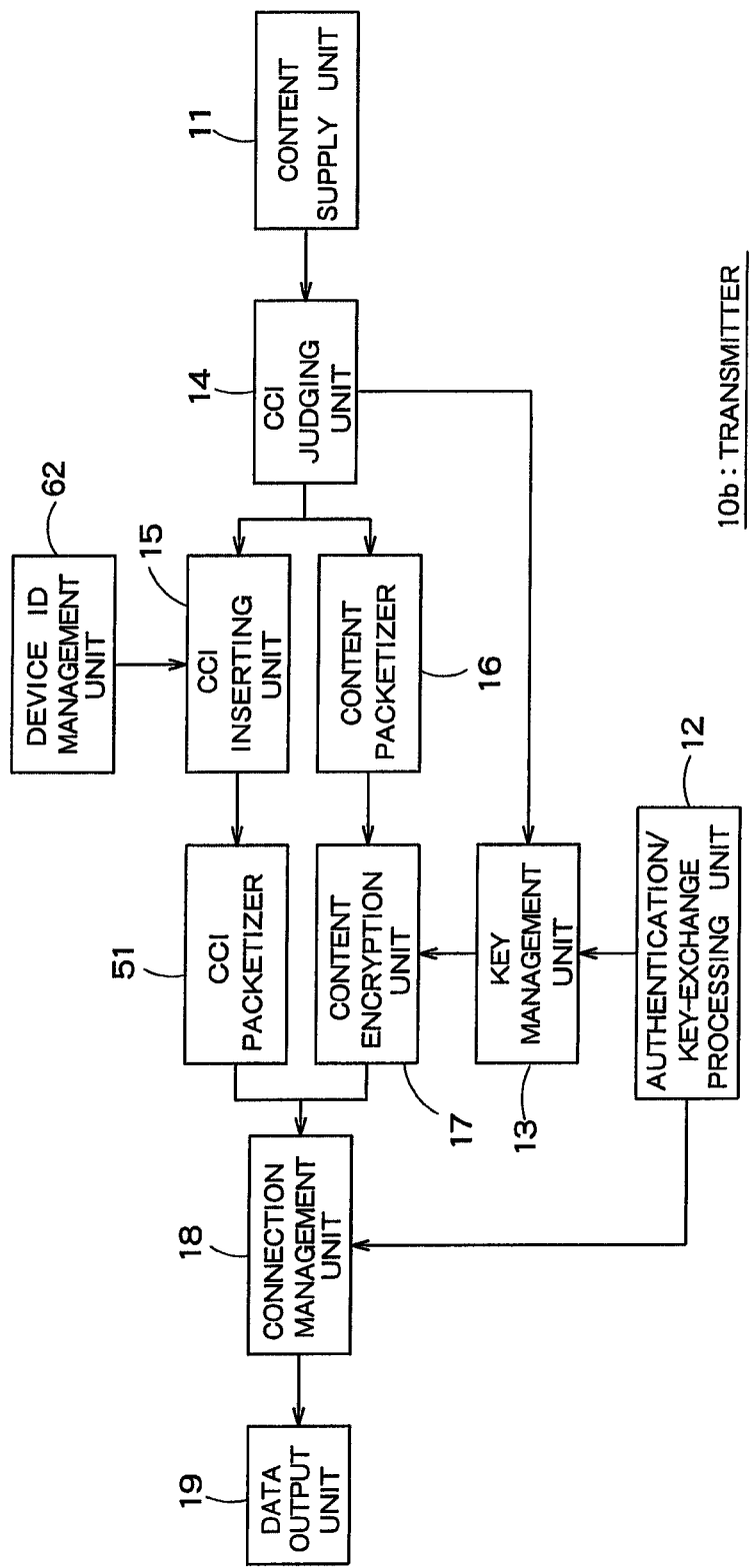
F I G. 18

US 8,707,033 B2

INFORMATION PROCESSING APPARATUS AND INFORMATION PROCESSING METHOD

CROSS REFERENCE TO RELATED APPLICATIONS

This application is based upon and claims the benefit of priority from the prior PCT Application No. PCT/JP2009/060779, filed on Jun. 12, 2009, the entire contents of which are incorporated herein by reference.

FIELD

The present invention relates to an information processing apparatus for receiving or transmitting content having copyright to be protected.

BACKGROUND

Content transmitted by a digital information device is various digital data. The data is, for example, moving image data such as MPEG2 and MPEG4, audio data, stream data, text data, or still image data. Since such digital data can be essentially duplicated without being deteriorated, it is necessary to pay special attention to the copyright of the content. Various proposals are made to increase the convenience of the content while protecting the copyright of the content (see Non Patent Literatures 1 to 3, for example).

[Non Patent Literature 1] DTCP Specification Volume 1 Revision 1.51, http://www.dtcp.com/data/info%2020071001%20DTCP%20V1%201 p51.pdf

[Non Patent Literature 2] DTCP Volume 1 Supplement E Mapping DTCP to IP, Revision 1.2, http://www.dtcp.com/data/info%2020070615%20DTCP%20V1SE%2 01p2.pdf

[Non Patent Literature 3] ARIB TR-B14, Terrestrial Digital Television Broadcasting Application Rule Technical Material, Association of Radio Industries and Businesses Each of the above Non Patent Literatures 1 to 3 does not assume the possibility that new copy control information is added in the future, and does not consider the case where content is transmitted to both of a device capable of interpreting the new copy control information and a device incapable of interpreting the new copy control information.

The present invention has been made to provide an information processing apparatus capable of protecting the copyright of content while effectively using the content, even when new copy control information is added in the future.

In order to solve the above problem, according to an aspect of the present invention, there is provided an information processing apparatus comprising:

an authentication and key exchange processing unit to perform an authentication and key exchange process with a communication device;

a packet selector to determine whether a packet transmitted from the communication device is a content packet comprising encrypted content or a CCI packet comprising at least one CCI set corresponding to a combination of at least one piece of copy control information and a CCI set identifier for identifying each CCI set;

a content key generator to retrieve a content key based on an authentication key generated in the authentication and key exchange process, and the copy control information included in the CCI packet;

a content decryption unit to decrypt, based on the content key, the encrypted content which is included in the content packet and received following the CCI packet;

a CCI set identifier management unit to manage a CCI identifier corresponding to recognizable copy control information;

a CCI selector to select, when the packet determined by the packet selector is the CCI packet, a CCI identifier to be used in a receiving process by judging whether or not the CCI identifier included in the CCI packet corresponds to the CCI identifier managed by the CCI set identifier management unit;

a CCI analyzer to analyze copy control information corresponding to the CCI identifier selected by the CCI selector;

a content processing unit to perform, based on an analysis result of the CCI analyzer, the receiving process on the content data corresponding to the content packet received following the CCI packet;

a first communication connection unit to perform the authentication and key exchange process; and a second communication connection unit to transmit the content packet and the CCI packet.

Further, according to another aspect of the present invention, there is provided an information processing apparatus comprising:

an authentication and key exchange processing unit to perform an authentication and key exchange process with a communication device;

a CCI packetizer to generate, when receiving a content request from the communication device with which the authentication and key exchange process has been successfully performed, a CCI packet of corresponding content data, the CCI packet comprising at least one CCI set corresponding to a combination of at least one piece of copy control information and a CCI set identifier for identifying each CCI set;

a content key generator to retrieve a content key for encrypting the content data based on an authentication key generated in the authentication and key exchange process, and the copy control information included in the CCI packet;

a content packet generator to generate a content packet comprising label information corresponding to the authentication key and encrypted content obtained by encrypting the content data using the content key; and a data output unit to transmit, after transmitting the CCI packet, the content packet to which the copy control information included in the CCI packet is applied.

According to the present invention, it is possible to protect the copyright of content while effectively using the content, even when new copy control information is added in the future. [BRIEF DESCRIPTION OF DRAWINGS]

BRIEF DESCRIPTION OF THE DRAWINGS

FIG. 5 is a diagram showing an example of the format of copy control information.

FIG. 6 is a diagram expressing an example of the packet format of content outputted to a network by a transmitter 10*a* according to a first embodiment of the present invention.

FIG. 7 is a diagram showing the format of content data 38 according to the first embodiment.

FIG. 11 is a flow chart showing an example of the operation steps of the receiver 20a of FIG. 10.

FIG. 12 is a sequence diagram showing the process steps of a content transmitting/receiving system having the transmitter 10a of FIG. 8 and the receiver 20a of FIG. 10.

FIG. 13 is a diagram showing the format of a CCI packet 33 according to a second embodiment.

FIG. 15 is a diagram showing the format of the CCI packet 33 according to a third embodiment.

FIG. 17 is a diagram showing the format of the CCI packet 33 according to a fourth embodiment.

FIG. 18 is a block diagram showing the internal structure of a transmitter according to the fourth embodiment.

DETAILED DESCRIPTION

Figure 1:
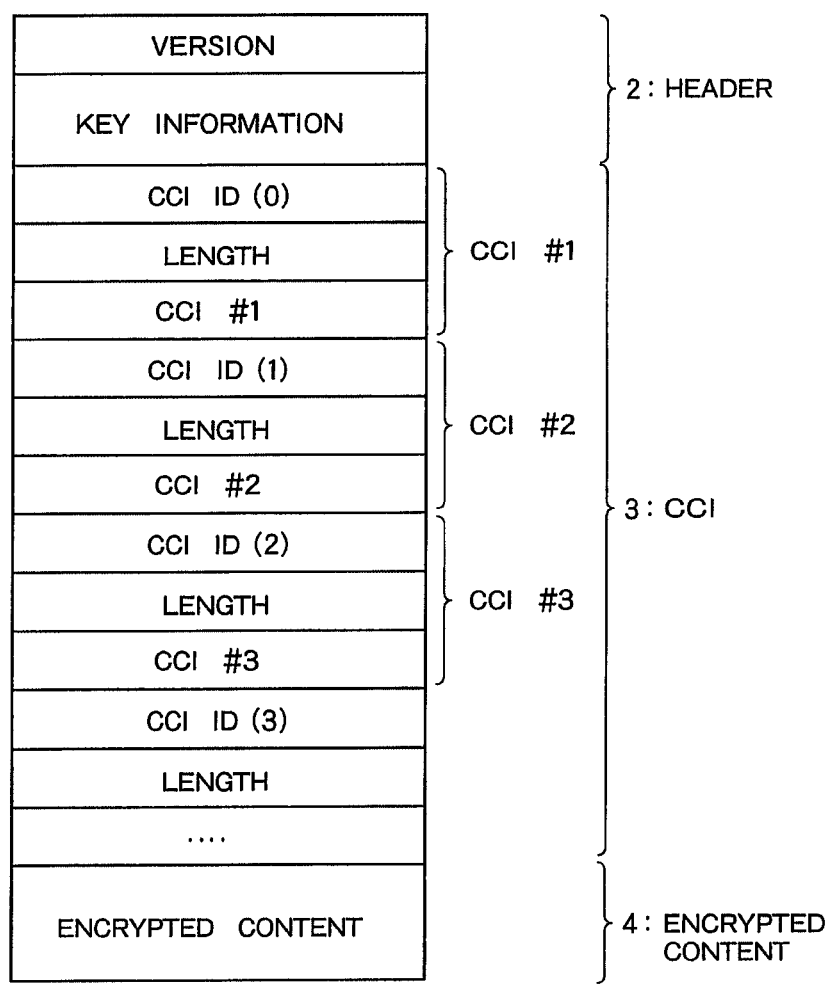
FIG. 1 is a diagram expressing an example of the structure of a content packet 1 outputted to a network by a transmitter.

Hereinafter, embodiments of the present invention will be explained in detail referring to the drawings.

First, what is to be achieved by the embodiments of the present invention will be explained before concretely explaining the embodiments of the present invention.

The embodiments the present invention is characterized in meeting the following conditions (1) to (4) to securely protect the copyright of content while simultaneously improving the convenience of the content.

(1) Various Copy Control Information can be Transmitted.

As defined in the above described Non Patent Literatures 1 and 2, various copy control information such as copy generation management information and permission for a limited number of copies is defined even in the current technology, and used in Japanese digital broadcasting etc. Therefore, a system capable of efficiently transmitting the various copy control information in the home network is required. Here, the permission for a limited number of copies indicates so-called "dubbing 10" in Japan.

(2) Copy Control Information can be Added.

The birth of a new business model, for example, may require the definition of new copy control information. For example, although a flag for permitting copy of one generation only is defined to express copy generation management at the present moment. However, a flag defining permission for copy of three generations may be defined in a new business model. It is required that such new copy control information can be easily added.

(3) Compatibility with Legacy Receivers and Legacy Transmitters is Provided.

When adding new copy control information, content should be transmitted from a transmitter corresponding to the new copy control information to a receiver manufactured and shipped in the past. The receiver manufactured and shipped in the past is not required to be able to interpret the new copy control information but is required to operate without causing interoperability problem when receiving the content having the new copy control information.

Non Patent Literature 1 has a function of transmitting generation management information from a transmitter to a receiver, but does not assume the transmission with content management information with time management. For example, suppose a case where copy control information concerning time limitation is newly defined to permit the received content to be accumulated and reproduced until a certain deadline date. In this case, existing copy control information of Copy One Generation showing permission for recording and newly defined copy control information of Rental Time (permission for use within the time shown by Rental Time) showing time limitation are given to the content by the transmitter to transmit the content with the time limitation that the content is permitted to be recorded and reproduced within the time shown by Rental Time. At this time, a receiver capable of recognizing the new copy control information of Rental Time can interpret and operate correctly, but a legacy receiver which is capable of recognizing only generation management information interprets that the content is permitted for one generation copy and records and reproduces the content beyond the time shown by Rental Time.

As a similar problem, suppose a case where new copy control information concerning the number of copies is defined when conventional copy control information defines only generation management information showing permission for one generation copy. In this case, the transmitter interprets the new copy control information, and gives information X showing permission for one generation copy and the number of copies to the content, and transmits the content with the limitation that one generation copy is permitted within an X number of copies. At this time, a receiver capable of receiving the new copy control information interprets correctly, but a legacy receiver which is capable of recognizing only generation management information interprets that the content is permitted for one generation copy and makes an unlimited number of copies.

In the above two examples, it is impossible to consider that the legacy receiver interprets the original intention of the transmitter. When a legacy receiver receives content, it is necessary to provide a unit for determining whether the content can be interpreted or not. Since it is not certain what type of copy control information is newly defined in the future, it is important to provide a system which does not cause the above problems.

(4) Various Content Formats can be Supported.

Digital content widely used at present has various formats for transmitting the content, such as MPEG2-PS for a recording-type DVD and a home IP network; and MPEG2-TS for digital broadcasting, and thus which copy control information should be inserted must be determined with respect to each format.

Particularly, MPEG2-TS used for digital broadcasting in each country is different in bit assignment of the copy control information (the meaning of bit length and bits) even if the format of the content itself is the same, and similarly, the copy control information is not always inserted in the same format.

For example, if country A defines 11b for Copy Never and 00b for Copy Free in bit assignment and country B defines 00b for Copy Never and 11b for Copy Free, when the receiver receives content having copy control information set to 11, the receiver can interpret the copy control information as Copy Never and Copy Free and the interpretation changes depending on the country which is judged to define the copy control information. It is necessary to provide a system which does not cause such a wrong interpretation.

Note that the copy control information (CCI) means only generation management information as a narrow interpretation. The generation management information includes Copy Never showing copy prohibition, Copy One Generation (COG) showing permission for one generation copy, and Copy Free showing permission for unlimited copy.

In the following explanation, in addition to the generation management information, CCI includes various management information concerning content protection, such as the number of copies, reproduction period information, image quality limitation (ICT: Image Constraint Token), and permission for digital output only (DOT: Digital Only Token).

The receiver performs control for recording, output to the outside, drawing by the device concerned, etc., depending on the received copy control information. Further, although the term of content management information (CMI) is used in addition to the term of copy control information (CCI) in some cases, here, content management information is used for the same meaning as copy control information.

As a method for outputting content to a home network while protecting the copyright of the content, DTCP method and DTCP-IP method are widely used. Hereinafter, both of these methods are referred to as a DTCP-IP method.

However, at present, the DTCP-IP method has only a function for notifying CCI representing the generation management information of copy, such as Copy One Generation (permission for copy of one generation only), and complicated CCI cannot be transmitted from the transmitter to the receiver. Further, a field (E-EMI field) defined for transmitting copy control information has a fixed length and there are few kinds of CCI which can be inserted therein, and thus the above request (3) for expandability cannot be satisfied if new CCI is added and the bit length falls short in the end.

In a technique (DTCP_descriptor) defined as a method for transmitting CCI having expandability, typical copy control information is inserted in the E-EMI field, the remaining copy control information is embedded in the content, and the CCI to be embedded is given expandability. However, DTCP_descriptor can be applied only to MPEG-TS format, and thus the above request (2) for supporting various formats cannot be satisfied.

FIG. 1 shows a technique for solving these problems. FIG. 1 is a diagram expressing an example of the structure of a content packet (CCI & content packet) 1 outputted to a network by a transmitter. The content packet 1 of FIG. 1 includes a header 2, CCI 3, and encrypted content 4.

The header 2 includes fields for version information and key information. The version information field is not essential. The key information field includes key information (N) updated depending on time or transmission data size. An encrypted content field includes content encrypted by a content key (Kc).

The CCI 3 includes fields for an ID representing the type of CCI, a byte length of CCI, and a value of CCI, with respect to each CCI. In FIG. 1, it is premised that the bit length of the ID representing the type of CCI is a fixed length, but the bit length of the ID may be changed into a variable length by defining a new Length field (not shown) showing its bit length.

For example, when defining, as CCI, the number of copies which can be generated by a receiver, the CCI ID corresponding to the CCI is set to a number (e.g., i) previously determined between the transmitter and the receiver, and the value of the CCI is set to a permissible number of copies.

The receiver determines whether or not the CCI is recognizable using the CCI ID, interprets only the value of CCI shown by a recognizable CCI ID, and performs a process in accordance with the value of the CCI. For example, a receiver incapable of creating a plurality of content copies skips the value field of CCI in which CCI ID=i. On the other hand, a receiver capable of creating a plurality of content copies reads the field showing CCI ID=i in the CCI 3, and makes copies corresponding to the value.

As stated above, the transmitter can transmit the same content to all receivers regardless of the functions of each receiver, by adding, to the content packet 1, copy control information and an ID corresponding to the copy control information.

Figure 2:
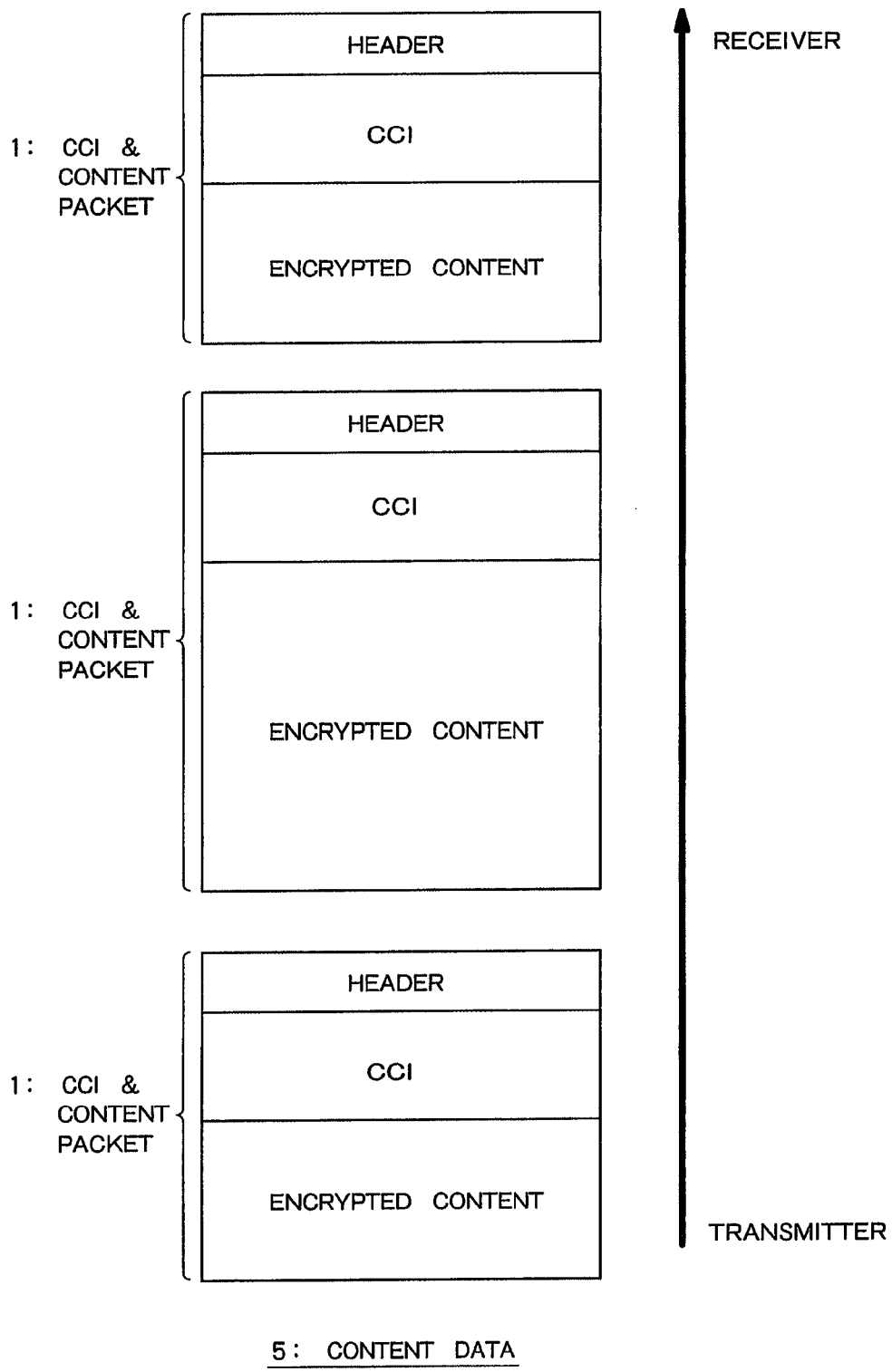
FIG. 2 is a diagram showing an example of the format of content data 5.

Content data 5 transmitted from the transmitter to the receiver is consisted of one or more the content packet 1 of FIG. 1. FIG. 2 is a diagram showing an example of the format of the content data 5. As shown in FIG. 2, the content data 5 is formed of a plurality of CCI & content packets 1, and each of the CCI & content packets 1 includes the header 2, the CCI 3, and the encrypted content 4, similarly to FIG. 1.

The encrypted content 4 is encrypted using the content key (Kc) previously shared between the transmitter and the receiver. When calculating the content key (Kc), the value of the CCI may be used. In this case, when the CCI is illegally altered in the middle of communication, the encrypted content 4 cannot be decrypted.

Figure 3:
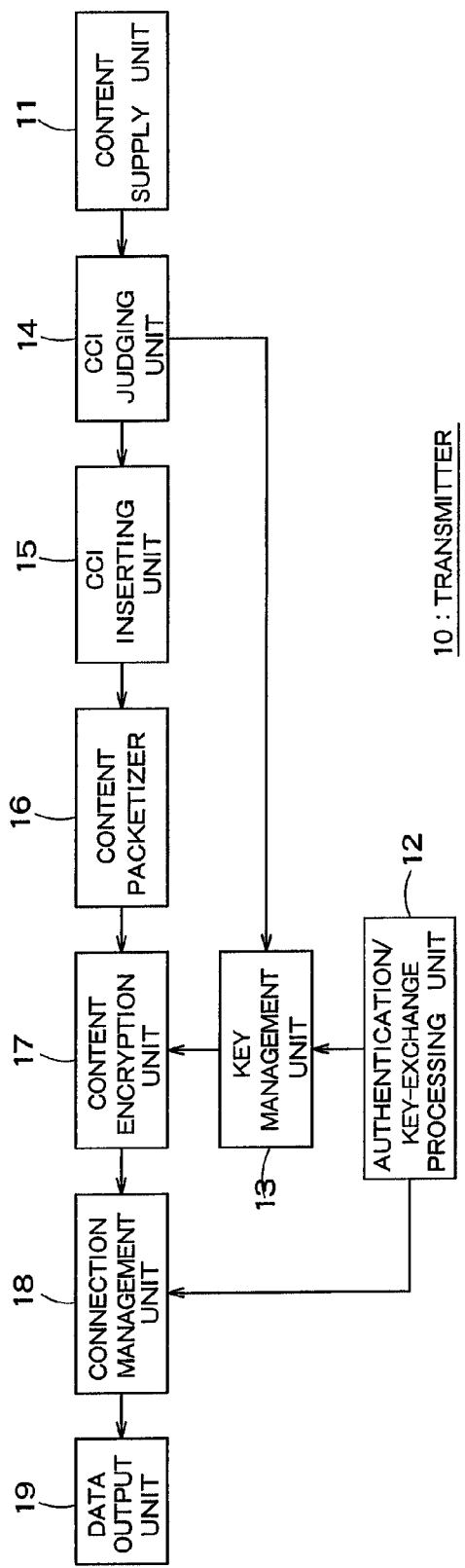
FIG. 3 is a block diagram showing an example of the internal structure of a transmitter 10 capable of transmitting the content data of FIG. 2.

FIG. 3 is a block diagram showing an example of the internal structure of a transmitter 10 capable of transmitting the content data of FIG. 2. The transmitter 10 of FIG. 3 has a content supply unit 11, an authentication/key-exchange processing unit 12, a key management unit 13, a CCI judging unit 14, a CCI inserting unit 15, a content packetizer 16, a content encryption unit 17, a connection management unit 18, and a data output unit 19.

The content supply unit 11 supplies unencrypted plaintext content. The plaintext content is digital broadcasting content which can be received by a digital broadcasting TV, content recorded by a digital recording device such as an HDD, etc.

The authentication/key-exchange processing unit 12 performs an authentication/key-exchange process with the receiver. The authentication/key-exchange processing unit 12 performs the authentication/key-exchange process with each receiver, and generates, if the authentication/key-exchange process has been successfully performed, a common key Kx by a random number generator (not shown) to use the common key Kx when encrypting the content. Then, the authentication/key-exchange processing unit 12 generates encrypted key data by encrypting the common key Kx using a shared key exchanged with a receiver with which the authentication/key-exchange process has been successfully performed, and transmits the encrypted key data to the receiver.

Considering the case where the receiver receives the common keys Kx from a plurality of transmitters 10, the transmitter 10 may transmit the encrypted common key Kx added with a common key label serving as an identifier of the common key Kx so that the receiver receiving encrypted content can identify the transmitter 10 of the common key used to encrypt the content. This common key label itself is not secret information, and thus may be transmitted in an unencrypted plaintext format while being added to the common key Kx.

A well-known technique such as AES (Advanced Encryption Standard) may be used as a cryptographic algorithm to encrypt or decrypt the common key Kx by the shared key, and the technique is not particularly limited.

Here, the authentication/key-exchange process performed by the authentication/key-exchange processing unit 12 means a process for generating a shared key when each one of the transmitter 10 and the receiver authenticates that the other is a compliant device properly given a license by a specific licensing agency. A well-known technique such as ISO/IEC 9798-3 and ISO/IEC 9798-2 may be used as an authentication method, and the technique is not particularly limited.

The key management unit 13 performs a process for calculating and managing the content key (Kc) based on the common key Kx, CCI, and key information. The key information is a value updated depending on data size or time, and used to make the content key function as a time-varying key. As a rule to be employed, the initial value of the key information may be set to a random number generated by a random number generator (not shown) and may be increased (or reduced) one by one with each update, or the value may be set to a random number generated with each update.

The key information itself is not secret information, and thus may be transmitted in a plaintext format as a part of the header of the content packet. The content key (Kc) is updated when the CCI of unencrypted plaintext content is updated, that is, when any one of CCI values in the CCI packet changes and the content key Kc must be calculated again, or when the value of the key information changes.

The CCI judging unit 14 performs a process for judging the CCI value of the plaintext content supplied from the content supply unit 11, notifying the key management unit 13 about the update timing of the content key Kc, and notifying the CCI inserting unit 15 about the CCI value.

The CCI inserting unit 15 converts the CCI value notified by the CCI judging unit 14 into a form expressed by an ID (hereinafter referred to as CCI ID) representing the type of CCI, and sets the CCI value in the CCI field shown in FIG. 1. The CCI ID is a unique value defined in the specification made by a licensing agency etc. For example, a CCI ID formed of a specific value is assigned to copy generation management information of Copy Never (copy prohibition).

In accordance with the definition, the CCI inserting unit 15 performs a process for converting the value judged by the CCI judging unit 14 into the CCI ID, Length, and CCI value. Naturally, this conversion process is not limited to Copy Never, and is performed on various CCI of the content supplied from the content supply unit 11.

The content packetizer 16 performs a process for reorganizing the encrypted content in a predetermined format. The content encryption unit 17 performs a process for performing an encryption process on the content data part of the content packet.

The connection management unit 18 performs a process for managing a connection for the authentication/key-exchange process and a connection for the packet transmitting the CCI and content data. Different connections (e.g., TCP connections) are used as the connection for the authentication/key-exchange process and the connection for the packet transmitting the CCI packet and content data.

The data output unit 19 performs a process for an IP (Internet Protocol) layer or a physical layer lower than the IP layer.

Figure 4:
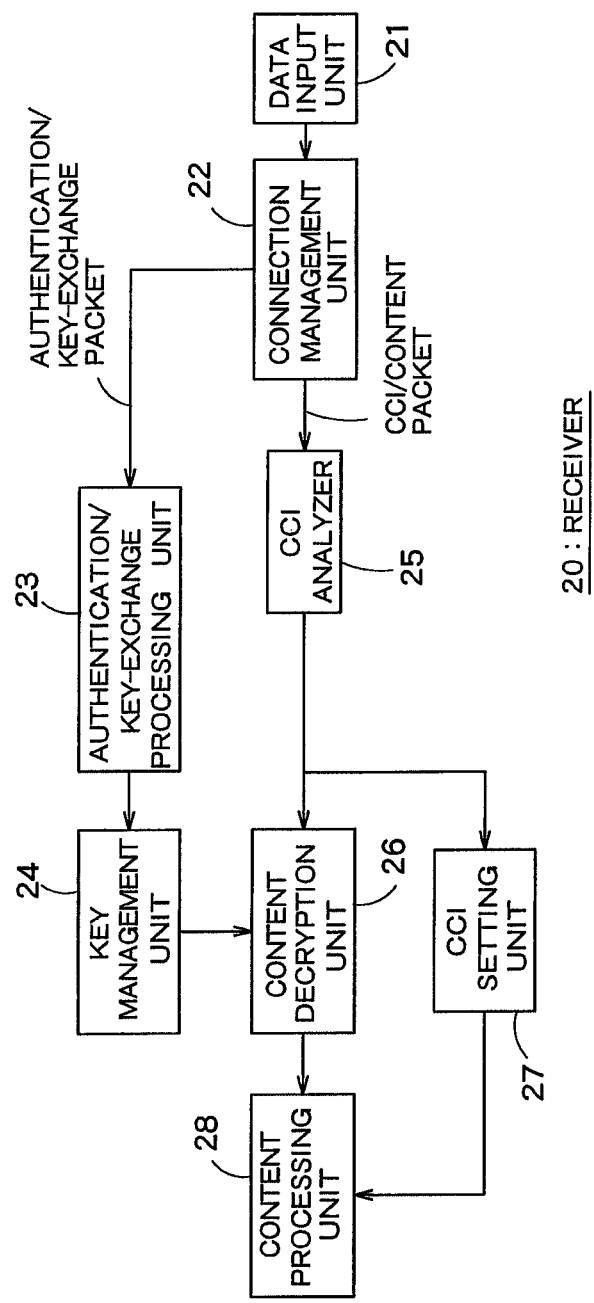
FIG. 4 is a block diagram showing an example of the internal structure of a receiver 20 corresponding to the transmitter 10 of FIG. 3.

FIG. 4 is a block diagram showing an example of the internal structure of a receiver 20 corresponding to the transmitter 10 of FIG. 3. As shown in FIG. 4, the receiver 20 has a data input unit 21, a connection management unit 22, a authentication/key-exchange processing unit 23, a key management unit 24, a CCI analyzer 25, a content decryption unit 26, a CCI setting unit 27, and a content processing unit 28.

The data input unit 21 performs a process for an IP (Internet Protocol) layer to input the content data transmitted from the transmitter 10 through a network or a process for a physical layer lower than the IP layer.

The connection management unit 22 performs a process for managing a connection for the authentication/key-exchange process and a connection for the packet transmitting the CCI packet and content data. Different connections (e.g., TCP connections) are used as the connection for the authentication/key-exchange process and the connection for the packet transmitting the CCI packet and content data.

The authentication/key-exchange processing unit 23 performs the authentication/key-exchange process with the transmitter 10. When the authentication/key-exchange process has been successfully performed, the authentication/key-exchange processing unit 23 shares a shared key with the transmitter 10, receives the common key Kx encrypted using the shared key, and decrypts the common key Kx using the shared key.

When the process of the authentication/key-exchange processing unit 23 has been successfully performed, the key management unit 24 receives the common key Kx from the authentication/key-exchange processing unit 23 and retains it. When common key label information is added to the common key Kx in the authentication/key-exchange process, the common key Kx and common key label may be retained as a pair.

The CCI analyzer 25 reads the content data having the format shown in FIG. 2, analyzes the part corresponding to the CCI field in the content data, the CCI ID included in the CCI field, and the CCI value shown by the CCI ID, and notifies the CCI setting unit 27 about the result.

The content decryption unit 26 calculates the content key Kc based on the CCI value obtained by the CCI analyzer 25 and the value of the common key Kx retained by the key management unit 24, decrypts the content using the content key Kc, and transmits plaintext content to the content processing unit 28.

The CCI setting unit 27 makes the content processing unit 28 perform appropriate copy control based on the analysis result of the CCI analyzer 25.

The content processing unit 28 processes the content in accordance with the instructions by the CCI setting unit 27. For example, when the CCI setting unit 27 sets Copy Never (copy prohibition), and the receiver 20 is currently recording the received content, it stops from performing the process for storing the content, even if the receiver 20 has a function of recording content.

The structure of the content packet shown in FIG. 1 causes no problem when each CCI operates completely independently, but causes a problem when CCI items depend on each other. For example, suppose a case where there are CCI including Rental Time representing a permissible recording period for the content and CCI including generation management information of the copy. Concretely, Rental Time is expressed by a relative value such as 24 hours (playbacking recorded content is permitted for 24 hours) or an absolute value such as 13:00, Jan. 1, 2010 (playbacking recorded content is permitted until 13:00, Jan. 1, 2010). The combination of the Rental Time and generation management information makes it possible to express a limitation (Copy One Generation+Rental Time) for permitting copy of one generation only while limiting the playback period to 24 hours, and a limitation (EPN+Rental Time) for permitting unlimited copy while limiting the playback period to 24 hours.

Here, for convenience, the CCI ID of CCI representing the generation management information is defined as M, and the CCI ID of CCI representing the Rental Time is defined as N. When the transmitter 10 permits copy of one generation only and limits the playback period to 24 hours, copy control information given to the content has a format as shown in FIG. 5. That is, the value of Copy One Generation is inserted in the field of CCI ID=M in CCI 31 representing generation management information, and the value of 24 hours is inserted in the field of CCI ID=N in CCI 32 representing Rental Time.

When the receiver 20 has a capability of interpreting both of generation management information and Rental Time, the receiver 20 can be correctly informed that recording of a copy is permitted only in this device and the playback period is 24 hours, by confirming each CCI ID and each CCI value. However, the receiver 20 capable of interpreting only generation management information skips the CCI of Rental Time and interprets only the record of generation management information. Since the generation management information permits copy of one generation only, the content is copied to this device, and no playback period is set. As stated above, there is a case where the CCI intended by the transmitter 10 is not correctly transmitted to the receiver 20 when using the format as shown in FIG. 1 and FIG. 5.

Accordingly, embodiments of the present invention to be explained in detail hereinafter are characterized in that the transmitter 10 can meet the above conditions (1) to (4) and the receiver 20 can perform the operation corresponding thereto, based on the premise that all of the receivers 20 to which the transmitter can transmit content cannot necessarily interpret the CCI correctly.

(First Embodiment)

FIG. 6 is a diagram expressing an example of the packet format of content outputted to a network by a transmitter 10a according to a first embodiment of the present invention, and shows the format of a CCI packet 33 obtained by packetizing CCI. The difference from FIG. 1 is that an identifier (CCI Set ID) is given to a combination of one or more CCI items, instead of giving a CCI ID to each CCI.

For example, CCI Set ID(0) is the identifier of CCI formed of the combination of CCI (CCI #1) of 2 bits showing generation management information, CCI (CCI #2) of 1 bit showing the image quality limitation (Image Constraint Token) on analog output, and CCI (CCI #3) of 1 bit showing the prohibition of analog output (Digital Only Token).

Further, CCI Set ID(1) is the identifier of CCI formed of the combination of CCI (CCI #x) of 4 bits showing generation management information, CCI (CCI #y) of 1 bit showing the permission for a limited number of copies, and CCI (CCI #z) of 4 bits showing the number of copies.

As stated above, the CCI Set ID is the identifier (CCI set identifier) for distinguishing the combination of CCI (hereinafter referred to as CCI set) included. As stated above, the CCI set identifier is the information for distinguishing a specific CCI set included in the CCI packet 33. A certain CCI Set ID and another CCI Set ID are in an inclusive relation, partially overlap each other, do not overlap each other at all, or include the same CCI having different CCI values. The inclusive relation shows a case where CCI Set ID=X includes the CCI included in CCI Set ID=Y and while additionally including different CCI, for example. The partial overlap shows a case where CCI Set ID=X and CCI Set ID=Y include the same CCI while including a CCI different from each other.

In the CCI set corresponding to the CCI Set ID, when the content data is formed of a multiplexed stream such as MPEG-TS, it is possible to specify the CCI to be set for each stream.

The CCI Set ID must be unique depending not only on the type of CCI included in each CCI set but also on the format of CCI and the bit assignment of CCI, in order to prevent a case where the same CCI Set ID value is used.

For example, when there are two CCI sets having completely the same format (in terms of form, length, and bit assignment) excepting that one CCI set uses 1 and the other CCI set uses 0 to define that the image quality limitation (expressed by ON/OFF) on analog output is ON, the same identifier of CCI Set ID=Z must not be assigned thereto although the two CCI sets are similar to each other.

When the transmitter 10a transmits content in which the image quality limitation on analog output is ON, the content is transmitted by setting a CCI Set ID value to Z. There is no problem when the receiver 20 is implemented to interpret that 1 means ON, but when the receiver 20 is implemented to interpret that 0 means ON, the receiver 20 which received the content interprets that it is unnecessary to limit image quality limitation on analog output, and thus the CCI Set ID must be previously set to the specific value of Z. In the operation, the CCI set ID may be assigned so that a licensing organization distributing the secret key used for performing authentication and key exchange between devices is unique by each CCI set.

As shown in FIG. 6, the CCI packet 33 includes a Version field 34 showing version information, a Length field 35 showing the length of the CCI set field, and a CCI set field 36 formed of one or more CCI sets. Note that the Version field and the Length field constitute a header 37 of the CCI packet 33, but this header is not essential. The Length field defined in each CCI set field shows the length of each CCI set field. One CCI set includes one or more CCI items.

FIG. 7 is a diagram showing the format of content data 38 according to the first embodiment. FIG. 7 is different from FIG. 1, Non Patent Literature 1, and Non Patent Literature 2 in that content data is packetized separately from CCI. Concretely, content data has a format in which the CCI packet 33 is transmitted followed by one or more content packets 39 to which the CCI of the CCI packet 33 should be applied. The CCI packet 33 includes CCI having the format of FIG. 6, and the content packet 39 includes a header 40 and encrypted content 41.

In the example shown in FIG. 7, the CCI included in the CCI packet 33 shown on the rightmost side is applied to the three content packets 39 from the right. The CCI included in the second CCI packet 33 from the left is applied to the leftmost content packet 39.

In the example shown in FIG. 7, the CCI packet 33 is switches in midstream, but when the CCI of the content does not change, it is possible to transmit the CCI packet 33 only once before transmitting the content, without transmitting the CCI packet 33 thereafter. Further, even when the CCI does not change, the CCI packet 33 may be inserted corresponding to each content packet 39.

In the known art shown in Non Patent Literature 1 and Non Patent Literature 2, CCI which can be known by the receiver 20 before decrypting encrypted content is limited to generation management information etc. and the other kinds of CCI is embedded in unencrypted content (plaintext content), and thus the receiver 20 cannot know all CCI values before decrypting the content.

Further, the bit width for inserting adjunct data such as CCI has a fixed length depending on the format of content, which generates no expandability and makes it impossible to additionally define new CCI.

On the other hand, in the first embodiment, various kinds of CCI including generation management information is not embedded in encrypted content and the CCI packet 33 is arranged separately from the encrypted content. Accordingly, the receiver 20 can grasp the CCI combination given to the content before decrypting the content, and the CCI packet 33 can be expanded depending on the format of the content. Therefore, new CCI can be easily defined. Note that how to calculate the key used to encrypt the content will be mentioned later.

Figure 8:
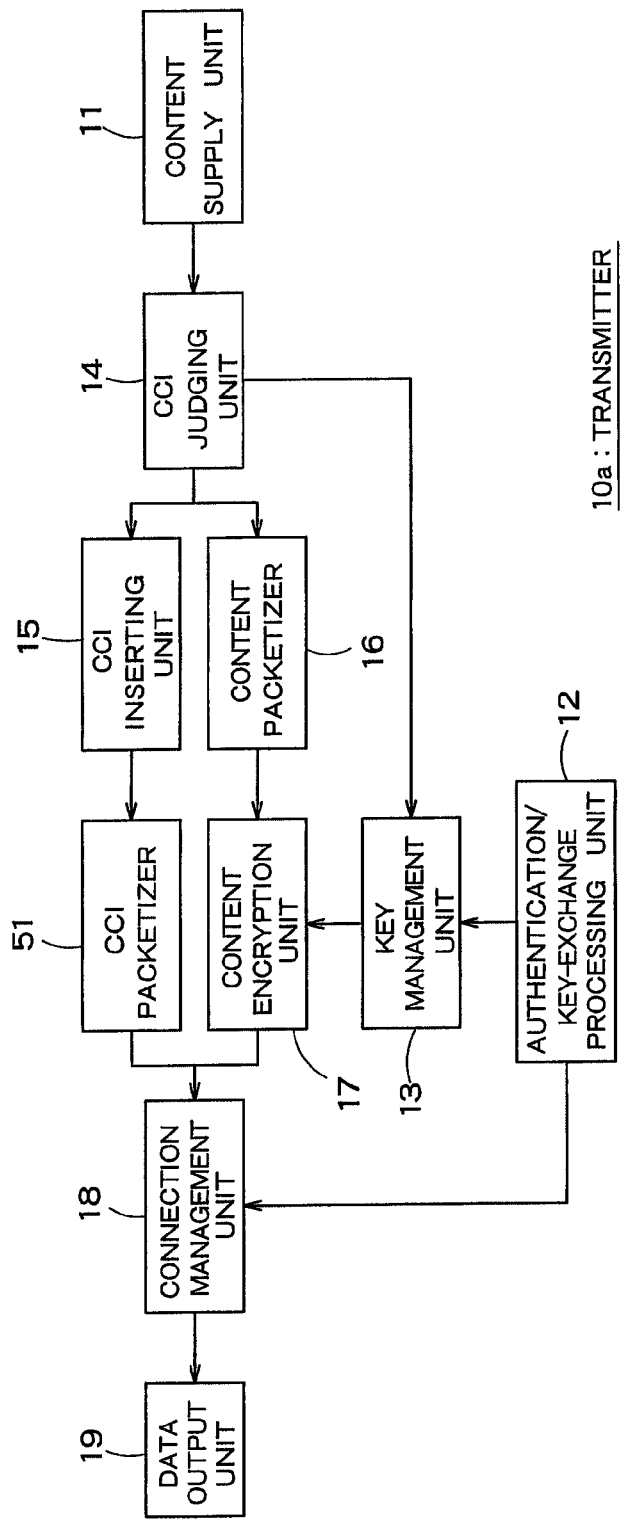
FIG. 8 is a block diagram showing the internal structure of the transmitter 10a according to the first embodiment.

FIG. 8 is a block diagram showing the internal structure of the transmitter 10a according to the first embodiment. As shown in FIG. 8, the transmitter 10a has the content supply unit 11, the authentication/key-exchange processing unit 12, the key management unit 13, the CCI judging unit 14, the CCI inserting unit 15, a CCI packetizer 51, the content packetizer 16, the content encryption unit 17, the connection management unit 18, and the data output unit 19. The content packetizer 16 and the content encryption unit 17 correspond to a content packet generator.

The difference from the transmitter 10a of FIG. 3 is that the CCI packetizer 51 for generating the CCI packet 33 is further arranged. In FIG. 3, the transmitter 10a inserts CCI in the content packet 39. On the other hand, the transmitter 10a according to the first embodiment has the CCI packetizer 51 for performing a process for generating the CCI packet 33 obtained by packetizing CCI in a predetermined format, in order to transmit the CCI by a packet different from the content packet. Since the CCI packet 33 is arranged separately from the content packet 39, the content packetizer 16 does not perform a process for inserting CCI, differently from FIG. 3.

The CCI inserting unit 15 converts the CCI value associated with the content notified from the CCI judging unit 14 into the form of FIG. 6 to be expressed by each CCI Set ID, and generates the CCI packet 33 including a CCI set formed of a CCI value and a CCI Set ID.

For example, the copy generation management information of Copy Never (copy prohibition) may be expressed by a 2-bit value when the CCI corresponds to a certain CCI Set ID, and may be expressed by a 4-bit value when the CCI corresponds to another CCI Set ID. As stated above, the conversion process of bit number is performed considering which form and which value should be set to each CCI ID in order to express the value of Copy Never. Naturally, this conversion process is not limited to Copy Never, and is performed on various CCI for the content supplied from the content supply unit 11.

Further, in the transmitter 10a shown in FIG. 3, only one CCI item represents copy generation management information in the CCI packet 33, while in the process of FIG. 8, CCI representing copy generation management information can be defined by a plurality of CCI sets. For example, copy generation management information may be defined by both of CCI Set ID(0) and CCI Set ID(1). When the transmitter transmits a CCI packet including CCI Set ID(0) and CCI Set ID(1), copy generation management information acquired by the CCI analyzer 25 is inserted in both of CCI Set ID(0) and CCI Set ID(1). When a licensing association defines a plurality of CCI Set IDs, the transmitter 10a may generate a CCI set having all CCI Set IDs interpretable thereto to insert the CCI set in the CCI packet 33, or may selects a CCI Set ID to insert, in the CCI packet 33, only the CCI set corresponding to the selected CCI Set ID.

Figure 9:
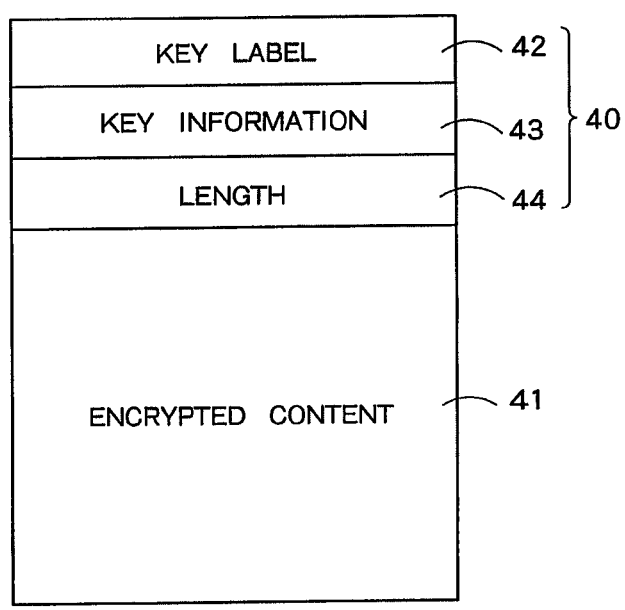
FIG. 9 is a diagram showing an example of a detailed format of a content packet 39 shown in FIG. 8.

FIG. 9 is a diagram showing an example of a detailed format of the content packet 39 shown in FIG. 8. The content packet 39 of the present embodiment has the header field 40 and the encrypted content field 41. The header field 40 further has a key label field 42, a key information field 43, and a Length field 44.

The key label field 42 stores unique label information assigned to each common key Kx, so that the receiver 20 can grasp which transmitter 10a has the key used to encrypt the content. The key information field 43 stores key information updated by the transmitter 10a depending on data size or time. As will be mentioned later, the key information is used to calculate the content key (Kc) in some cases. The Length field stores the length of encrypted content.

The encrypted content field 44 stores plaintext content data when encryption is not performed yet. Note that the plaintext content data may be added with padding information (e.g., a value of 0) depending on a cryptographic algorithm.

The content key (Kc) is calculated using the CCI value defined by the CCI packet 33 and the common key Kx. Concretely, the content key (Kc) is calculated based on the following formula (1), for example. Here, the CCI value includes at least the value of the CCI set field shown in FIG. 6.

$$\text{Content key }(Kc)=f(CCI, Kx) \quad (1)$$

So that the content key is updated under a predetermined condition, the calculation formula may include the key information (N), as shown in the following formula (2).

$$\text{Content key }(Kc)=g(CCI, Kx, N) \quad (2)$$

Further, as shown in the following formula (3), parameters may be compressed in a predetermined bit length using a hash function (function h) etc.

$$\text{Content key }(Kc)=i(h(CCI, Kx), N) \quad (3)$$

The functions f, g, and i in the above formulas (1) to (3) are encryption algorithm calculated using the parameters parenthesized on the right-hand side. An existing cryptographic algorithm such as AES may be used as the algorithm.

When the CCI value associated with the content supplied from the content supply unit 11 changes while the content is being transmitted, the CCI packetizer 51 of the transmitter 10a generates the CCI packet 33 again using the updated CCI value. Further, the content included in the content packet 39 transmitted after the CCI packet 33 is encrypted using the content key (Kc) recalculated using the updated CCI value of the CCI packet 33.

When using the content key (Kc) as shown in the above formula (2) or (3), the transmitter 10a generates the CCI packet 33 and an encrypted packet by recalculating the content key (Kc) also when the key information is updated depending on data size or time.

The timings when the transmitter 10a inserts the CCI packet 33 in the same connection (TCP connection in the case of HTTP, and session in the case of RTP) are as follows, (a) only once before transmitting content data, (b) when the CCI of content is changed, (c) periodically, or the combination of these timings.

FIG. 9 shows an example where the key information is inserted in the content packet 39. By including the content packet in the key information, CCI and key information can be converted separately from each other. For example, to periodically update the key information depending on time or data size means to periodically update the content key (Kc). Generally, resistance against the attack of supposing the encryption key from encrypted data is increased when the key used to encrypt data is changed compared to the case where the same key is continuously used. Even when the insertion timing of the CCI packet 33 is set to the above (a), the content key (Kc) can be updated by updating the key information of the content packet 39.

In addition to the technique of inserting the key information in the content packet 39, the following techniques can be adopted, i.e. a method of inserting the key information only in the CCI packet 33, a technique of inserting the same value in both of the CCI packet 33 and the content packet 39, and a technique of inserting key information items having different values in the CCI packet 33 and the content packet 39.

In the technique of inserting the key information only in the CCI packet 33, the CCI packet 33 is inserted when the key information or CCI changes. In the technique of inserting key information items having different values in the CCI packet 33 and the content packet 39, the content key (Kc) may be calculated using both of the key information items or using the value of one information item updated. Further, it is also possible to define the key information in the content packet 39 and to calculate the hash value of the CCI set field of the CCI packet 33 so that the hash value is used as a part (e.g., upper X bits) of the key information field of the content packet 39 while the rest of the field (e.g., lower Y bits) is formed as a random number and updated by increasing the number one by one. In this case, the total bit length of the key information is X+Y.

The process performed by the transmitter 10a of FIG. 8 is similar to the transmitter 10a of FIG. 3, excepting the above process, and thus detailed explanation thereof will be omitted.

Figure 10:
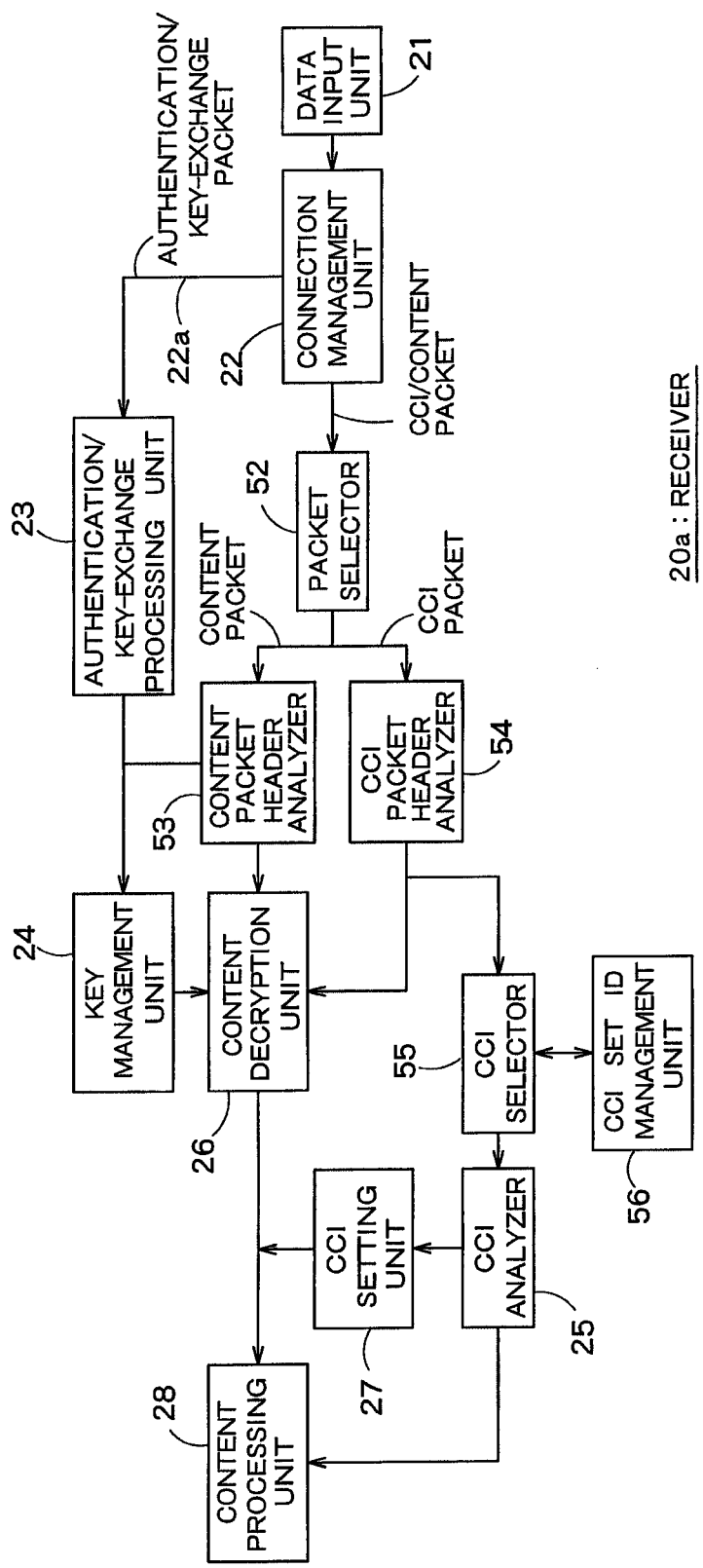
FIG. 10 is a block diagram showing an example of the internal structure of a receiver 20a according to the first embodiment.

Next, a receiver 20a will be explained. FIG. 10 is a block diagram showing an example of the internal structure of the receiver 20a according to the first embodiment. As shown in FIG. 10, the receiver 20a has the data input unit 21, the connection management unit 22, the authentication/key-exchange processing unit 23, the key management unit 24, a packet selector 52, a content-packet header analyzer 53, the content decryption unit 26, a CCI-packet header analyzer 54, a CCI selector 55, a CCI Set ID management unit 56, the CCI analyzer 25, the CCI setting unit 27, and the content processing unit 28.

The difference from the receiver 20a of FIG. 4 is to have the packet selector 52, the CCI-packet header analyzer 54, the CCI Set ID management unit 56 (CCI set identifier management unit), the CCI selector 55, and the CCI analyzer 25. Further, the process of the content decryption unit 26 is different.

The packet selector 52 performs a process for determining whether the received data is the content packet 39 or the CCI packet 33 shown in FIG. 7, and a process for allocating the data to the content-packet header analyzer 53 and the CCI-packet header analyzer 54. As a method for distinguishing the content packet 39 from the CCI packet 33, identifiers for distinguishing them may be arranged in the headers of the content packet 39 and the CCI packet 33.

In the content packet 39 transmitted by the transmitter 10a described in Non Patent Literature 2, information for distinguishing cryptographic algorithm is defined. The information for distinguishing cryptographic mode and cryptographic algorithm should be set to a value which is not defined in Non Patent Literature 2 so that even if the content packet 39 transmitted by the transmitter 10a according to the first embodiment is received by the receiver 20a described in Non Patent Literature 2, the received packet is ignored or the connection is cut off. In this way, the receiver 20a described in Non Patent Literature 2 cannot know the substance of the packet.

The CCI-packet header analyzer 54 performs a process for analyzing which CCI Set ID is included in the CCI set field of the CCI packet 33 shown in FIG. 6. As stated above, the content key (Kc) is calculated using the CCI information included in the CCI packet 33.

Differently from the content data shown in FIG. 2, CCI in the present embodiment is included in the CCI packet 33 separately from the content packet 39. The CCI-packet header analyzer 54 transmits the CCI value included in the CCI packet 33 to the content decryption unit 26.

In the content data shown in FIG. 2, the content key (Kc) can be calculated on a packet basis since CCI is transmitted by the CCI & content packet 39 shown in FIG. 2. However, in the present embodiment, a plurality of content packets 39 may be sequentially received, and thus the content packet 39 is not necessarily transmitted immediately after the CCI packet 33.

The content key (Kc) is calculated using both of CCI and key information. That is, the content key (Kc) is recalculated when the CCI or key information is updated. The content decryption unit 26 decrypts the content using the recalculated content key (Kc). In other words, the receiver 20a receiving the CCI & content packet 39 shown in FIG. 2 can calculate the content key (Kc) using only the common key Kx and the CCI & content packet 39, but the content decryption unit 26 must store the CCI value until receiving the next CCI packet 33 since the content packet 39 in the first embodiment does not include CCI. This point is a difference from the receiver 20a shown in FIG. 4. When the CCI value included in the CCI packet 33 is changed, the content decryption unit 26 decrypts the content packet 39 received thereafter using the updated value of the content key (Kc).

The transmitter 10a deals with the key information by the following methods, i.e. (a) a method of inserting the key information only in the CCI packet 33; (b) a method of inserting the key information only in the content packet 39; (c) a method of inserting the same value in the CCI packet 33 and the content packet 39; and (d) a method of inserting different values in the CCI packet 33 and the content packet 39.

In the case of (a), the content decryption unit 26 calculates the content key (Kc) using the key information included in the CCI packet 33.

In the case of (b), the content decryption unit 26 calculates the content key (Kc) using the key information included in the content packet 39.

In the case of (c), the content key (Kc) is calculated using the key information included in any one of the CCI packet 33 and the content packet 39, but it is also possible to perform a comparison process to decrypt the content only when the key information included in the CCI packet 33 and the key information included in the content packet 39 are consistent with each other.

In the case of (d), the content key (Kc) may be calculated using the key information values or using one key information value updated.

When the hash value of the CCI packet 33 is inserted as a part of the key information, the hash value is calculated using the CCI included in the CCI packet 33, and a comparison process is performed to decrypt the content only when the hash value and a part of the key information are consistent with each other. If no consistency is found, decryption of the content is stopped.

The CCI Set ID management unit 56 of FIG. 8 manages the value of CCI Set corresponding to the CCI that the receiver 20a can interpret. The CCI selector 55 compares the CCI Set ID analyzed by the CCI-packet header analyzer 54 with the value stored in the CCI Set ID management unit 56, in order to select the CCI set included in the CCI content. When the receiver 20a can interpret a plurality of CCI Set IDs, the CCI selector 55 determines which CCI Set ID should be selected among the CCI Set IDs included in the CCI packet 33, namely, determines which CCI set should be employed. As a manner for making this determination, the following techniques can be employed. i.e. a technique of previously specifying the priorities for the CCI sets to be employed, a technique of determine which CCI set should be employed, depending on the state of the receiver 20a at that time, and a technique of negotiating with the transmitter 10a through a network. For example, when the content processing unit 28 of the receiver 20a has a plurality of processes for recording, output to the outside device, internal rendering, etc., the technique of determining the CCI set depending on the state of the receiver 20a is a technique for selecting the CCI set corresponding to a process selected from the processes. Further, also when the content processing unit 28 can record content in a plurality of different recording forms, the CCI set is selected depending on a selected recording form.

For example, when the receiver 20a has a method for protecting and recording content using CCI set A and a method for protecting and recording content using CCI set B, which one of CCI set A and CCI set B should be employed is determined depending on the recording method at that time. When the CCI packet 33 does not include a CCI Set ID interpretable to the device concerned, the reception of content data is stopped.

The CCI analyzer 25 analyzes which CCI is included in the CCI Set selected by the CCI selector 55, and notifies the CCI setting unit 27 about the result.

FIG. 11 is a flow chart showing an example of the operation steps of the receiver 20a of FIG. 10. First, the receiver 20a transmits an authentication/key-exchange request to the transmitter 10a (step S1), and performs an authentication/key-exchange process with the transmitter 10a. After that, whether or not the authentication/key-exchange process has been successfully performed is determined (step S2), and if the authentication/key-exchange process is failed, an error process is performed (step S3), and the no subsequent process is performed.

If the authentication/key-exchange process has been successfully performed, the encrypted common key Kx transmitted from the transmitter 10a is received (step S4), and decrypts the common key Kx using the key shared in the key exchange process. Next, a CCI Set ID recognizable to the receiver 20a is notified to the transmitter 10a (step S5), and after that, a content request is transmitted to the transmitter 10a (step S6).

The content data transmitted from the transmitter 10a depending on this content request has a format as shown in FIG. 7, including the CCI packet 33 and the content packet 39. When receiving such content data (step S7), whether a recognizable CCI Set ID is included in the CCI packet 33 is confirmed (step S8). If not included, the reception of the content is stopped (step S9), and the error process of step S3 is performed. If included, the content key (Kc) is calculated based on any one of the above formulas (1) to (3) using the common key Kx and the CCI in the CCI packet 33 selected by the CCI selector 55, and encrypted content is decrypted using the content key (Kc) (step S10).

FIG. 12 is a sequence diagram showing the process steps of a content transmitting/receiving system having the transmitter 10a of FIG. 8 and the receiver 20a of FIG. 10. In the present embodiment, two connections are arranged between the transmitter 10a and the receiver 20a. One is provided to perform the authentication/key-exchange process (first communication connection unit 22a), and the other is provided to transmit the content packet 39 and the CCI packet 33 (second communication connection unit 22b).

FIG. 12 shows an example where the transmitter 10a transmits content to two the receivers 20a. In this case, totally four connections A to D are arranged. First, receiver A performs authentication and key exchange with the transmitter 10a (step S11). When the authentication and key exchange have been successfully performed (step S12), the receiver 20a transmits a content request (step S13), and the transmitter 10a transmits the CCI packet 33 and the content packet 39 as a response (step S14). The CCI Set ID included in the CCI packet 33 at this time is any one of CCI Set IDs interpretable to the receiver 20a (in this case, CCI Set ID=a) or all CCI Set ID values interpretable to the transmitter 10a. Naturally, the transmitter 10a may transmit the CCI packet 33 including a CCI Set ID uninterpretable to the receiver 20a as an abnormal sequence, and in that case, the receiver 20a stops receiving the content.

Although not described in FIG. 12, the receiver 20a notifies the transmitter 10a about interpretable CCI Set IDs, before transmitting a content request. When giving this notification, the following techniques can be employed, i.e. a technique of giving notification using the connection for the authentication and key exchange in the authentication/key-exchange process, a technique of giving notification using the connection for the authentication and key exchange before transmitting the content request, and a technique of inserting the CCI Set ID in the content request using the connection for transmitting content.

Instead of notifying the transmitter 10a about interpretable CCI Set IDs by the receiver 20a, the transmitter 10a may inquire the receiver 20a about which CCI Set ID is interpretable. When the receiver 20a notifies the transmitter 10a about an interpretable CCI Set ID, the CCI Set ID may be transmitted while being encrypted and protected using the common key Kx, shared key, etc. or may be transmitted in plaintext. When a CCI Set ID is transmitted in plaintext and illegitimately altered in the middle of communication, the receiver 20a cannot interpret the CCI Set ID or interprets the CCI of the content depending on the altered CCI Set ID, and thus the CCI is not informed to the receiver 20a contrarily to the intention of the transmitter 10a. Therefore, such alteration of the CCI Set ID on the communication path is a service obstruction to the receiver 20a, but the above objects (1) to (4) are not disturbed since the copyright of the content is not illegitimately handled.

It is considered that an advantage obtained when the transmitter 10a previously receives the notification of CCI Set ID before receiving the content request is that implementation to the transmitter 10a can be made easier. For example, suppose a case where the transmitter 10a transmits content to a plurality of the receivers 20. The transmitter 10a calculates the total sum of CCI Set ID combinations interpretable to each receiver 20a. Each receiver 20a asynchronously transmits the content request to the transmitter 10a, and when the content receiving request is received, the transmitter 10a transmits the CCI packet 33 including all of the calculated CCI Set IDs.

As stated above, when a content receiving request is received, the transmitter 10a is not required to judge from which receiver 20a the content receiving request has been transmitted, and thus the process of the transmitter 10a can be simplified.

Similarly to the above steps S11 to S14, receiver B performs an authentication/key-exchange process with the transmitter 10a (step S15), and when the authentication/key-exchange process has been successfully performed (step S16), transmits a content request to the transmitter 10a (step S17), and receives the content transmitted from the transmitter 10a (step S18). At this time, the transmitter 10a distributes the content to the receiver A and receiver B through different transmission connections. When the transmitter 10a inserts a CCI Set in the CCI packet 33, any one of the following techniques can be used, i.e. (a) a technique of transmitting the CCI packet 33 including CCI Set ID=a to the receiver A while transmitting the CCI packet 33 including CCI Set ID=b to the receiver B; (b) a technique of transmitting the CCI packet 33 including CCI Set IDs of a and b to both of the receivers A and B; and (c) a technique of transmitting, by the transmitter 10*a*, the CCI packet 33 including all CCI Set IDs which can be packetized as the CCI packet 33, regardless of which CCI Set ID can be interpreted by the receiver 20*a*. In the case of (c), there is a case where information to be made invalid is included depending on the CCI set. For example, when transmitting content on which a permissible playback period is specified, if information showing the permissible playback period is included in all CCI sets, there is no problem. But there may be a case where not all CCI sets include information showing the permissible playback period. In order to cover such a case, the transmitter 10*a* may transmit the CCI packet 33 including the information showing that a specific CCI set is invalid. This information may be added to each CCI set, or CCI set list information showing which CCI set is invalid (or valid) in the CCI packet 33 may be added at the head of the CCI packet. Here, it is assumed that HTTP is used as a content transmission protocol, but a similar technique can be used when transmitting content using RTP.

An advantage obtained when a plurality of CCI sets are included in one CCI packet 33 as shown in the above (b) or (c) is that the CCI packet 33 and the content packet 39 can be transmitted through multicast. Generally, when performing multicast transmission, the same packet must be transmitted to a plurality of receivers 20*a*. By using the technique (b) or (c), the same CCI packet 33 and content packet 39 can be transmitted to a plurality of receivers 20, and communication band can be saved.

In order not to cause a problem when the legacy receiver 20*a* capable of interpreting only existing packet formats receives the CCI packet 33 shown in FIG. 6 or the content packet 39 shown in FIG. 9, information for distinguishing existing packet formats may be inserted in headers of the CCI packet 33 and the content packet 39. For example, as shown in Non Patent Literature 2, the header of an existing packet includes information for distinguishing cryptographic algorithm used to encrypt content (C_A field). At present, only AES is defined as an available cryptographic algorithm. If the header format of the CCI packet 33 shown in FIG. 6 and the content packet 39 shown in FIG. 9 is set to the same as the header format of an existing packet and the bits of the field for distinguishing cryptographic algorithm is set to show that cryptographic algorithm other than AES is used, it is expected that the CCI packet 33 or the content packet 39 received by the legacy receiver 20*a* covering only AES is disregard and destroyed. Further, so that the existing packet format can be distinguished from the CCI packet 33 and the content packet 39, the value of information (E-EMI field) defined in the header of the existing packet to distinguish cryptographic mode may be set to a value which is not currently defined, or the packet may be distinguished using the reserved area defined in the header of the existing packet.

Hereinafter, structural characteristics and effects of the first embodiment will be explained together hereinafter. The transmitter 10*a* according to the first embodiment transmits the CCI packet 33 separately from the content packet 39. The CCI packet 33 can include a plurality of CCI sets. Further, the CCI set has a variable length by defining a Length field, and thus it is possible to insert a plurality of CCI items each having an arbitrary length.

The CCI packet 33 capable of including a plurality of CCI sets shows that CCI can be easily added by assigning an unused CCI Set ID to the CCI required to be newly defined, which leads to the excellence in future expandability.

In the CCI packet 33 of the present embodiment, a unique CCI Set ID is assigned to each CCI set, and the receiver 20*a* decrypts content only when the device concerned can interpret the CCI corresponding to the CCI Set ID included in the CCI packet 33. The legacy receiver 20*a* does not interpret a newly defined CCI Set ID and skips it, and interprets only CCI sets recognizable to the device concerned, which does not cause a defect that the receiver 20*a* interprets the CCI contrarily to the intention of the transmitter 10*a*. Further, even when the CCI packet 33 has a newly defined CCI set, the receiver 20 capable of interpreting only old CCI sets can decrypt the content, since the old method can be still used to calculate the content key (Kc).

Since the CCI packet 33 is transmitted separately from the content packet 39, CCI can be transmitted without depending on the format of the content packet 39. Further, when newly defined CCI is inserted in the CCI packet 33, the content packet 39 is not influenced.

Further, since the value of the CCI set field is used to calculate the content key (Kc) for decrypting content data, the receiver 20*a* cannot acquire the value of correct content key (Kc) if the value of the CCI set field is altered in the middle of communication. As a result, the content cannot be interpreted using the altered value of the CCI set field, and the copyright of the content can be protected.

Further, the transmitter 10*a* can transmit the same content without distinguishing the CCI Set IDs interpretable to each receiver 20*a*. Accordingly, the transmission process in the transmitter 10*a* is made easier.

(Second Embodiment)

In the format defined in the first embodiment, there is no relativity among respective CCI sets. In a second embodiment, a mandatory CCI set interpretable to every receiver 20*a* is defined in the CCI sets.

FIG. 13 is a diagram showing the format of the CCI packet 33 according to the second embodiment. As shown in FIG. 13, CCI sets of the CCI packet 33 includes a mandatory CCI set 45 interpretable to every receiver 20*a*, and optional CCI sets 46 each having the format shown in FIG. 6.

As stated above, by defining the mandatory CCI set 45, minimal interoperability can be ensured since the mandatory CCI can be interpreted by both of the transmitter 10*a* and the receiver 20*a* even when combination of CCI Set IDs recognizable to the transmitter 10*a* and that recognizable to the receiver 20*a* do not correspond to each other.

When arranging the optional CCI set 46, the following techniques can be used, i.e. (a) a technique of defining only CCI items which are not defined in the mandatory CCI set 45, and (b) a technique of inserting the same CCI as defined in the mandatory CCI set 45 while setting higher priority to the CCI defined in an optional format.

In the case of (b), for example, it is considered that only generation management information is defined in the mandatory CCI set 45, while generation management information and "Rental Time" serving as CCI concerning rental time are defined in a CCI format X in the optional CCI sets 46. At this time, suppose a case where the transmitter 10*a* transmits content which is permitted for copy of one generation only until the time specified by Rental Time. When Copy One Generation is defined as the mandatory CCI and Copy One Generation/Rental Time=N is defined in the CCI format X, there is a problem that the receiver 20*a* capable of interpreting only mandatory CCI can receive the content without time limitation.

However, when CCI of Copy Never is defined in the mandatory CCI set 45 and CCI of Copy One Generation/Rental Time=N is defined in the CCI format X in the optional CCI sets 46, the receiver 20a capable of interpreting only mandatory CCI is prohibited to record a copy, while the receiver 20a capable of interpreting the CCI format X receives the content which is permitted for copy of one generation only until the time specified by Rental Time.

In the present embodiment, although convenience of the receiver 20a capable of interpreting only the mandatory CCI set 45 is reduced, it is guaranteed that the intention of the copyright owner (transmitter 10a), which is namely to prohibit unlimited copy, is correctly transmitted to the receiver 20a. This is realized by defining the format of the CCI Set ID, and cannot be realized by the CCI format shown in FIG. 1.

Figure 14:
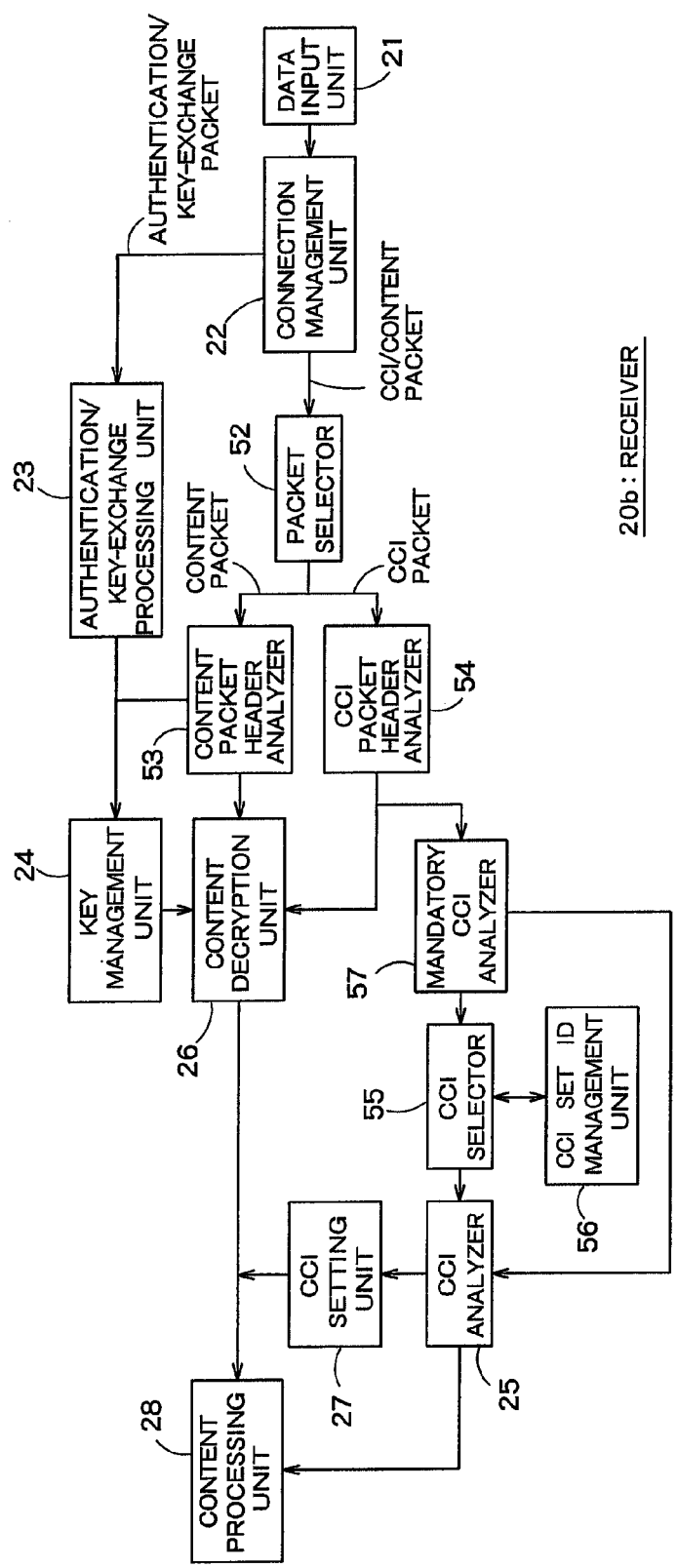
FIG. 14 is a block diagram showing an example of the internal structure of a receiver 20b according to the second embodiment.

FIG. 14 is a block diagram showing an example of the internal structure of a receiver 20b according to the second embodiment. The difference from the internal structure of the receiver 20b in the first embodiment is that a mandatory CCI analyzer 57 is arranged.

When only CCI items which are not defined in the mandatory CCI set 45 are defined in the optional CCI set 46, the mandatory CCI analyzer 57 analyzes which CCI item is included in the mandatory CCI part, and notifies the CCI analyzer 25 about the result. On the other hand, CCI item defined by the optional CCI set 46 is selected by the CCI selector 55. The CCI analyzer 25 determines the CCI used in the receiving process of the content, based on the analysis result of the mandatory CCI analyzer 57 and the selection result of the CCI selector 55.

When the CCI defined in the optional CCI set 46 includes the same CCI items as those defined in the mandatory CCI set 45, the CCI defined in the optional CCI set 46 can be given a higher priority. In this case, the CCI selector 55 judges whether a CCI Set ID interpretable to the device concerned is included in the received content, and if included, notifies the CCI analyzer 25 that the CCI defined in the interpretable CCI format should be employed. On the other hand, if not included, the CCI selector 55 notifies the CCI analyzer 25 that the CCI in the mandatory CCI part analyzed by the mandatory CCI analyzer 57 should be employed.

As stated above, in the second embodiment, since the mandatory CCI set 45 interpretable to every receiver 20b is included in the CCI packet 33, every receiver 20b can perform the minimal receiving process, and content can be effectively used without damaging the copyright protection of the content.

(Third Embodiment)

In the second embodiment the mandatory CCI set 45 is defined in the CCI packet 33 to ensure minimal interoperability. In a third embodiment to be explained below, minimal interoperability is guaranteed by permitting rendering (reproduction process) only by the device concerned, although the format of the CCI packet 33 is the same as that in the first embodiment.

FIG. 15 is a diagram showing the format of the CCI packet 33 according to the third embodiment. In FIG. 15, a Rendering Only field 47 is newly defined in the CCI packet 33. The Rendering Only field 47 is a field notifying the transmitter 10a that monitor output within the device concerned is permitted in the case of ON, and that output outside device is prohibited in the case of OFF.

As shown in FIG. 15, the Rendering Only field 47 is arranged in the header field of the CCI packet 33.

The receiver 20c according to the third embodiment checks the Rendering Only field 47 when a CCI Set ID recognizable to the device concerned is included in the CCI packet 33. Monitor output within the device concerned is permitted when the Rendering Only field 47 is ON, and output outside device is prohibited when the Rendering Only field 47 is OFF. When the CCI packet 33 includes a CCI Set ID recognizable to the device concerned, the Rendering Only field 47 is disregarded, and operation is performed in accordance with the CCI of the CCI set shown by the recognizable CCI Set ID.

As one of CCI requiring time management such as rental time, for example, when an unpublished content is transmitted, which has restrictions of permitting unlimited recording but prohibiting playback until the certain period specified in the content, the receiver 20c capable of interpreting the CCI of time management can record and playback the content, but the receiver 20c incapable of interpreting the time management must be prohibited not only to record and but also to playback the content. In this case, by letting the transmitter 10a transmit a packet in which the Rendering Only field 47 is set to OFF, only the receivers 20c capable of interpreting the CCI Set ID defining the CCI of time management is permitted to playback and recording the unpublished content while prohibiting the other receivers 20c to record and playback the content.

Figure 16:
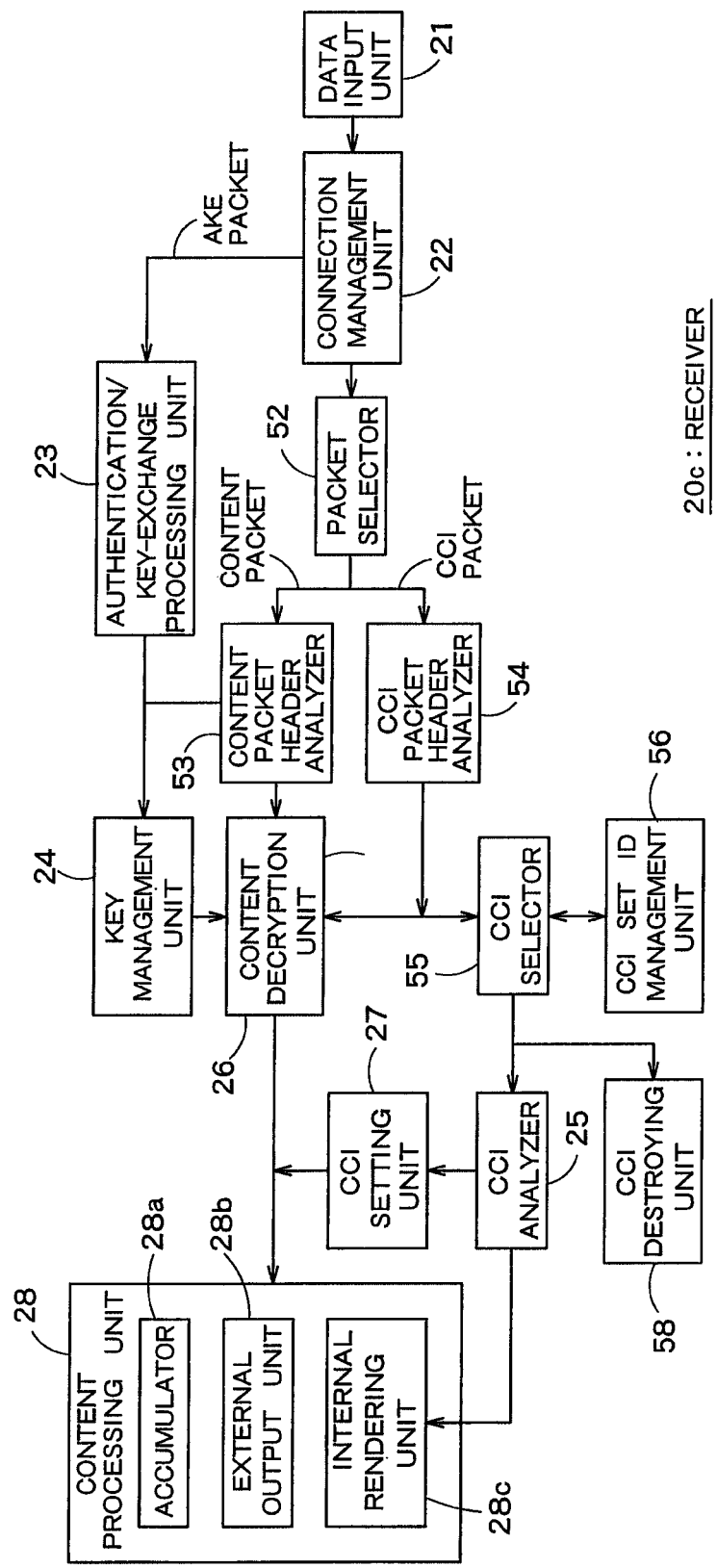
FIG. 16 is a block diagram showing an example of the internal structure of a receiver 20c according to the third embodiment.

FIG. 16 is a block diagram showing an example of the internal structure of the receiver 20c according to the third embodiment. The receiver 20c of FIG. 16 has a recording unit 28a, an external output unit 28b, and an internal rendering unit 28 in the content processing unit 28. Further, the receiver 20c has a CCI destroying unit 58.

The recording unit 28a performs a process for recording content in a hard disk etc. The external output unit 28b performs a process for outputting the content to an analog terminal or a digital terminal such as HDMI. The internal rendering unit 28c performs a process for playback and outputting the content to a display device (not shown) incorporated into the device concerned.

When a CCI Set ID managed by the CCI Set ID management unit 56 is not included in the CCI packet 33 associated with the content received by the CCI selector 55, the CCI analyzer 25 checks the Rendering Only field 47, and if the Rendering Only field 47 is ON, sets, in the internal rendering unit 28c, CCI for permitting the display device arranged in the device concerned to playback and output the content.

Naturally, it is considered that some devices do not have a hard disk having a recording function or an external output terminal, and thus it is not required to arrange all of the recorder unit 28a, the external output unit 28b, and the internal rendering unit 28c.

As stated above, in the third embodiment, the Rendering Only field 47 is arranged in the header field of the CCI packet 33, and thus when the receiver 20c cannot correctly interpret the CCI packet 33, the operation of the receiver 20c can be controlled by the value of the Rendering Only field 47, discarding the substance of the CCI packet 33 by the CCI destroying unit 58. Therefore, there is no fear that the receiver 20c incapable of correctly interpreting the CCI packet 33 performs a content receiving process contrarily to the intention of the transmitter 10a, and the copyright of the content can be protected.

In the first and the second embodiments, the internal process of the content processing unit 28 in the receiver 20c is not minutely divided, but it is considered that the content processing unit 28 has at least one of the recording unit 28a, the external output unit 28b, and the internal rendering unit 28c shown in FIG. 16.

(Fourth Embodiment)

In the technique shown the first embodiment, information (CCI Set ID) for distinguishing a CCI set is defined in the CCI packet transmitted by the transmitter, and the receiver acquires only the CCI set corresponding to the CCI set interpretable the device concerned by the CCI Set ID. In a fourth embodiment, the transmitter can specify a specific CCI set to be interpreted by a specific receiver.

FIG. 17 is a diagram showing the format of the CCI packet 33 according to the fourth embodiment. FIG. 17 is different from FIG. 6 in that the CCI set includes a device ID field 61 describing the list (Device IDs, device identification information) of device IDs of the receivers. The device ID list is information showing the list of devices capable of using the CCI set shown by the device IDs. In FIG. 17, the Device ID field is defined in each CCI set field, but it is also possible to define mapping information showing which CCI set field can be used by which Device ID, at the head of the CCI packet.

FIG. 18 is a block diagram showing the internal structure of a transmitter 10b according to the fourth embodiment. The difference from FIG. 8 is that a device ID management unit 62 is arranged and the device ID is inserted in the CCI inserting unit. Each receiver is assigned with a unique ID(Device ID) for distinguishing each device. This device ID should be issued by a licensing agency etc. to prevent that a plurality of receivers have overlapping values.

The CCI inserting unit performs a process for inserting the device ID of the receiver to instruct the receiver about which CCI should be used to receive content. For example, when a receiver A receives a content with the CCI shown by CCI Set ID(0) and a receiver B receives a content with the CCI shown by CCI Set ID(1), the transmitter 10b inserts the device ID of the receiver A in the Device IDs field of CCI Set ID(0) and inserts the device ID of the receiver B in the Device IDs field of CCI Set ID(1).

Note that the Device IDs field may store a plurality of device IDs. In this case, a Length field (not shown) may be defined to show the number of device IDs included in the Device IDs field. Note that a special value (e.g., value showing all 0s) may be inserted in the Device IDs field or the Device IDs field may be blanked, in order to show all receivers can use the CCI set.

Figure 19:
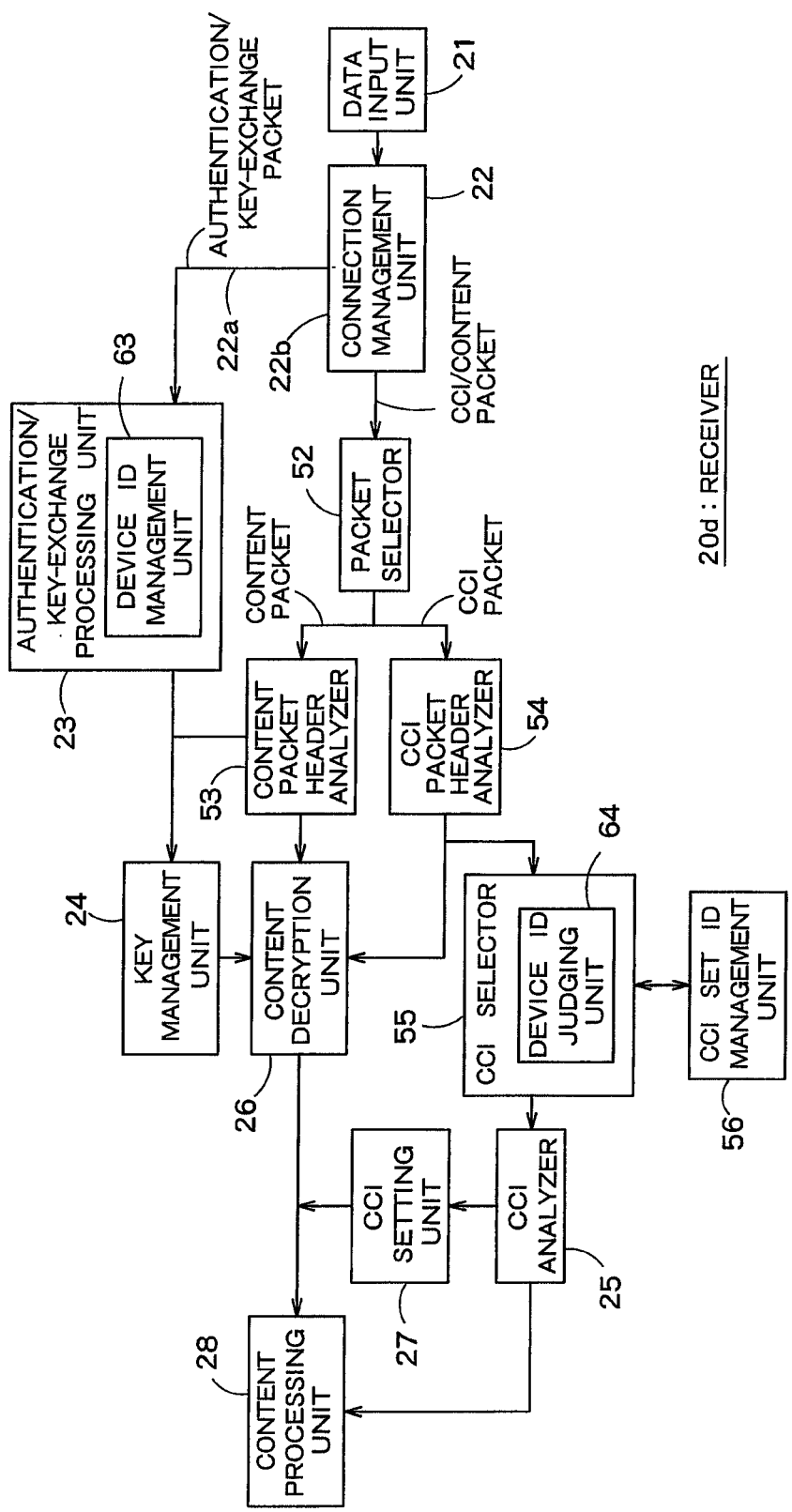
FIG. 19 is a block diagram showing the internal structure of a receiver according to the fourth embodiment.

FIG. 19 is a block diagram showing the internal structure of a receiver 20d according to the fourth embodiment. The difference from FIG. 10 is that a device ID management unit 63 is arranged in the authentication/key-exchange processing unit and a device ID judging unit (device identification information judging unit) 64 is arranged in the CCI selector. The device ID management unit 63 is a processing unit for storing the device IDs given by a licensing agency etc. The device ID judging unit 64 performs a process for selecting, from the CCI sets included in the receive CCI packet, a CCI set which can be used by the device concerned by confirming the Device IDs field.

In the present embodiment, it is possible to arrange a CCI packet having the same CCI Set ID and different Device IDs. For example, suppose a case where two CCI items concerning generation management information and permissible number of copies are included in CCI Set ID(0). Both of the receivers A and B can interpret CCI Set ID(0). Suppose a case where content to be transmitted sets Copy One Generation as generation management information while setting 3 as a permissible number of copies with respect to the receiver A, and sets Copy One Generation as generation management information while setting 5 as a permissible number of copies with respect to the receiver B. The transmitter 10b transmits a CCI packet in which one CCI set specifies CCI Set ID(0), the device ID of the receiver A, Copy One Generation, and permissible number 3 of copies and the other CCI set specifies CCI Set ID(0), the device ID of the receiver B, Copy One Generation, and permissible number 5 of copies. Each of the receivers A and B extracts the CCI set interpretable to the device concerned by the CCI Set ID and Device IDs field of the CCI packet, and performs copy control in accordance with the CCI shown by the CCI set.

As stated above, in the fourth embodiment, the transmitter 10b can specify which CCI set can be interpreted by which receiver by defining the Device IDs field in the CCI packet 33. Accordingly, when receiving a content receiving request from the receiver 20d, the transmitter 10b is not required to distinguish the receiver transmitting the content receiving request and thus can similarly transmit the CCI packet 33 to every receiver, which makes it possible to simplify the internal structure of the transmitter 10b. Further, each receiver 20d can specify the CCI set to be interpreted by the device concerned using the device ID in the CCI packet, which realizes multicast transmission and saves the occupied communication band.

The transmitters 10a and 10b and the receivers 20a to 20d explained in the above embodiments may be at least partially formed of hardware or software. In the case of software, a program realizing at least a partial function of the transmitter 10a and the receivers 20a to 20d may be stored in a recording medium such as a flexible disc and CD-ROM so that a computer can read and execute the program. The recording medium is not limited to a portable type such as a magnetic disk and an optical disk, and a fixed-type recording medium such as a hard disk device and a memory can be employed.

Further, a program realizing at least a partial function of the transmitters 10a and 10b and the receivers 20a to 20d may be distributed through a communication line (including wireless communication) such as the Internet. Further, this program may be encrypted, modulated, or compressed to be distributed through a wired line or a wireless line of the Internet, or through a recording medium after being stored therein.

Those skilled in the art may imagine additional effects and various transformations of the present invention based on the above description. Therefore, the aspects of the present invention are not limited to each of the above embodiments. Various addition, change, and partial elimination may be achieved within a scope of conceptual idea and intention of the present invention which are derived from the substance specified in the claims and its equivalents.

The invention claimed is:

1. An information processing apparatus, comprising:
an authentication and key exchange processing unit to perform an authentication and key exchange process with a communication device;
a first communication connection unit to perform the authentication and key exchange process;
a packet selector to determine whether a packet transmitted from the communication device is a content packet comprising encrypted content or a copy control information (CCI) packet comprising at least one CCI set corresponding to a combination of at least one piece of copy control information and a CCI set identifier for identifying each CCI set;
a second communication connection unit to receive the content packet and the CCI packet;
a content key generator to retrieve a content key based on an authentication key generated in the authentication and key exchange process, and the copy control information included in the CCI packet that is received immediately before the content packet;
a content decryption unit to decrypt, based on the content key, the encrypted content which is included in one or more content packets received following the received CCI packet;

a CCI set identifier management unit to manage a CCI set identifier corresponding to recognizable copy control information;

a CCI selector to select, when the packet determined by the packet selector is the CCI packet, a CCI set identifier to be used in a receiving process by judging whether or not the received CCI set identifier included in the CCI packet corresponds to the CCI set identifier managed by the CCI set identifier management unit;

a CCI analyzer to analyze copy control information corresponding to the selected CCI set identifier selected by the CCI selector; and a content processing unit to control, based on an analysis result of the CCI analyzer, content data corresponding to the one or more content packets received following the received CCI packet.

2. The apparatus of claim 1, wherein the content key generator retrieves the content key using the authentication key, the copy control information, and key information occasionally updated by the communication device under a predetermined condition.

3. The apparatus of claim 1, wherein the content key generator generates the content key using a hash value corresponding to the authentication key and the copy control information, and key information occasionally updated by the communication device under a predetermined condition.

4. The apparatus of claim 1, further comprising:

a mandatory CCI analyzer to analyze copy control information recognizable to every communication mate of the communication device and a CCI identifier corresponding thereto, when these are included in the CCI packet, wherein when it is detected that no identifier corresponding to the copy control information included in the CCI packet corresponds to the identifier managed by the CCI set identifier management unit, the content processing unit performs the receiving process on the content data based on an analysis result of the mandatory CCI analyzer.

5. The apparatus of claim 1, wherein when it is detected that no identifier corresponding to the copy control information included in the CCI packet corresponds to the identifier managed by the CCI set identifier management unit and the CCI packet includes specific copy control information separately from the CCI set included in the CCI packet, the content processing unit performs the receiving process on the content data based on the specific copy control information.

6. The apparatus of claim 1, wherein the receiving process of the content data performed by the content processing unit is at least one of recording of the content data, external output of the content data, and playback of the content data in its own device.

7. The apparatus of claim 1, wherein the CCI packet includes device type information for specifying a device for performing the content receiving process based on a corresponding CCI set for each CCI set, the apparatus further comprises a device identification information judging unit to judge whether or not the CCI set comprising the same device identification information as the device identification information of its own device exists among the CCI set in the CCI packet, and the CCI selector selects a CCI set to be used in the receiving process based on a judgment result as to whether or not the received CCI set identifier included in the CCI packet corresponds to the CCI identifier managed by the CCI set identifier management unit and a judgment result of the device identification information judging unit.

8. An information processing apparatus, comprising:

an authentication and key exchange processing unit to perform an authentication and key exchange process with a communication device;

a copy control information (CCI) packetizer to generate, when receiving a content request from the communication device with which the authentication and key exchange process has been successfully performed, a CCI packet of corresponding content data, the CCI packet comprising at least one CCI set corresponding to a combination of copy control information and a CCI set identifier for identifying each CCI set;

a content key generator to retrieve a content key for encrypting the content data based on an authentication key generated in the authentication and key exchange process, and the copy control information included in the CCI packet;

a content encrypting unit to encrypt the content data by using the content key generated based on the copy control information included in the CCI packet transmitted immediately before the content packet to generate an encrypted content;

a content packet generator to generate a content packet comprising label information corresponding to the authentication key and the encrypted content; and a data transmission unit to transmit the CCI packet and the content packet, based on the content request received from the communication device.

9. The apparatus of claim 8, wherein the content key generator retrieves the content key using: the authentication key; copy control information corresponding to the encrypted content; and key information occasionally updated by the communication device under a predetermined condition, and the content packet generator retrieves the content packet including: the label information; the key information; and a bit length of the encrypted content.

10. The apparatus of claim 8, wherein the CCI packetizer generates the CCI packet having a mandatory CCI set including: copy control information recognizable to every communication device; and a CCI set identifier corresponding thereto.

11. An information processing method, comprising:

performing an authentication and key exchange process with a communication device;

determining whether a packet transmitted from the communication device is a content packet comprising encrypted content or a copy control information (CCI) packet comprising at least one CCI set corresponding to a combination of at least one piece of copy control information and a CCI set identifier for identifying each CCI set;

retrieving a content key based on an authentication key generated in the authentication and key exchange process, and the copy control information included in the CCI packet that is received immediately before the content packet;

decrypting, based on the content key, the encrypted content which is included in one or more content packets received following the received CCI packet;

managing a CCI set identifier corresponding to recognizable copy control information;

selecting, when the packet determined in the determining step is the CCI packet, a CCI set identifier to be used in a receiving process by judging whether or not the received CCI set identifier included in the received CCI packet corresponds to the managed CCI set identifier;
analyzing copy control information corresponding to the selected CCI set identifier;
controlling, based on an analysis result of the analyzing step, content data corresponding to the one or more content packets received following the received CCI packet;
performing, using a first communication connection, the authentication and key exchange process; and
receiving, using a second communication connection, the content packet and the CCI packet.

12. The method of claim 11, wherein upon generating the content key, the content key is retrieved using the authentication key, the copy control information, and key information occasionally updated by the communication device under a predetermined condition.

13. The method of claim 11, wherein upon generating the content key, the content key is generated using a hash value corresponding to the authentication key and the copy control information, and key information occasionally updated by the communication device under a predetermined condition.

14. The method of claim 11, further comprising:
analyzing, by a mandatory CCI analyzer, copy control information recognizable to every communication mate of the communication device and a CCI identifier corresponding thereto, when these are included in the CCI packet,
wherein when it is detected that no identifier corresponding to the copy control information included in the CCI packet corresponds to the managed identifier, the receiving process on the content data is performed based on an analysis result of the mandatory CCI analyzer.

15. The method of claim 11, wherein when it is detected that no identifier corresponding to the copy control information included in the CCI packet corresponds to the managed identifier and the CCI packet includes specific copy control information separately from the CCI set included in the CCI packet, the receiving process on the content data is performed based on the specific copy control information.

16. The method of claim 11, wherein the receiving process of the content data is at least one of recording of the content data, external output of the content data, and playback of the content data.

17. The method of claim 11,
wherein the CCI packet includes device type information for specifying a device for performing the content receiving process based on a corresponding CCI set for each CCI set,
the method further comprises judging whether or not the CCI set comprising the same device identification information as the device identification information of its own device exists among the CCI set in the CCI packet, and
a CCI set is selected to be used in the receiving process based on a judgment result as to whether or not the received CCI set identifier included in the received CCI packet corresponds to the managed CCI identifier and a judgment result of the device identification information.

18. An information processing apparatus, comprising:
an authentication and key exchange processing unit to perform an authentication and key exchange process with a communication device;
a packet selector to determine whether a packet transmitted from the communication device is a content packet comprising encrypted content or a copy control information (CCI) packet comprising at least two CCI sets, each CCI set corresponding to a combination of at least one piece of copy control information and a CCI set identifier, the CCI packet comprising a CCI set having the CCI set identifier of a predetermined number and a CCI set having the CCI set identifier other than the predetermined number;
a content key generator to retrieve a content key based on an authentication key generated in the authentication and key exchange process and the copy control information included in the CCI packet;
a content decryption unit to decrypt, based on the content key, the encrypted content which is included in the content packet and received following the CCI packet;
a CCI set identifier management unit to manage a CCI identifier corresponding to recognizable copy control information;
a CCI selector to judge, when the packet determined by the packet selector is the CCI packet, whether or not the CCI identifier included in the CCI packet corresponds to the CCI identifier managed by the CCI set identifier management unit and to determine as the CCI packet, which have CCI set identifier, to be used for a receiving process when judged as corresponding to the CCI identifier managed by the CCI set identifier management unit;
a first CCI analyzer to analyze copy control information corresponding to the CCI identifier selected by the CCI selector;
a second CCI analyzer to analyze the CCI set having the CCI set identifier of the predetermined number, the CCI set being included in the CCI packet;
a content processing unit to perform the receiving process of content data based on an analysis result by the first CCI analyzer when the CCI set included in the CCI packet coincides with one identifier managed by the CCI set identifier management unit, or based on an analysis result by the second CCI analyzer when the CCI set included in the CCI packet coincides with none of the identifiers managed by the CCI set identifier management unit;
a first communication connection unit to perform the authentication and key exchange process; and
a second communication connection unit to receive the content packet and the CCI packet.

19. An information processing apparatus, comprising:
an authentication and key exchange processing unit to perform an authentication and key exchange process with a communication device;
a copy control information (CCI) packetizer to generate, when receiving a content request from the communication device with which the authentication and key exchange process has been successfully performed, a CCI packet comprising at least two CCI sets, each CCI set corresponding to a combination of at least one piece of copy control information and a CCI set identifier, the CCI packet comprising a CCI set having the CCI set identifier of a predetermined number and a CCI set having the CCI set identifier other than the predetermined number;
a content key generator to retrieve a content key for encrypting content data based on an authentication key generated in the authentication and key exchange process, and the copy control information included in the CCI packet;
a content packet generator to generate a content packet comprising label information corresponding to the authentication key and the encrypted content obtained by encrypting the content data using the content key; and a data transmission output unit to transmit, after transmitting the CCI packet, the content packet to which the copy control information corresponding to the CCI set having the CCI set identifier of the predetermined number or the copy control information corresponding to the CCI set having the CCI set identifier other than the predetermine number is applied, before a subsequent CCI packet is transmitted.

* * * * *